United States Patent
Ramezani et al.

(10) Patent No.: US 12,418,201 B2
(45) Date of Patent: Sep. 16, 2025

(54) SYSTEM AND METHOD FOR WIRELESS CHARGING FOREIGN OBJECT DETECTION

(71) Applicant: ELEAPPOWER LTD., Toronto (CA)

(72) Inventors: Ali Ramezani, Toronto (CA); Si Tan Wang, Toronto (CA)

(73) Assignee: ELEAPPOWER LTD., Toronto (CA)

( * ) Notice: Subject to any disclaimer, the term of this patent is extended or adjusted under 35 U.S.C. 154(b) by 0 days.

(21) Appl. No.: 19/120,880

(22) PCT Filed: Oct. 14, 2023

(86) PCT No.: PCT/CA2023/051370
§ 371 (c)(1),
(2) Date: Apr. 14, 2025

(87) PCT Pub. No.: WO2024/077400
PCT Pub. Date: Apr. 18, 2024

(65) Prior Publication Data
US 2025/0260267 A1    Aug. 14, 2025

Related U.S. Application Data

(60) Provisional application No. 63/416,352, filed on Oct. 14, 2022.

(51) Int. Cl.
*H02J 50/60*    (2016.01)
*B60L 53/124*   (2019.01)
(Continued)

(52) U.S. Cl.
CPC ............ *H02J 50/60* (2016.02); *B60L 53/124* (2019.02); *G01D 5/204* (2013.01); *H02J 50/10* (2016.02); *H02J 50/90* (2016.02)

(58) Field of Classification Search
CPC ......... H02J 50/60; H02J 50/10; B60L 53/124; G01D 5/204
See application file for complete search history.

(56) References Cited

U.S. PATENT DOCUMENTS

| | | | |
|---|---|---|---|
| 2016/0056661 A1* | 2/2016 | Tanaka | H02J 50/60 320/108 |
| 2019/0103771 A1* | 4/2019 | Piasecki | H04B 5/72 |

(Continued)

OTHER PUBLICATIONS

Patent Cooperation Treaty, International Search Report and Written Opinion, Application No. PCT/CA2023/051370, dated Dec. 12, 2023.

(Continued)

*Primary Examiner* — Dominic E Hawkins
(74) *Attorney, Agent, or Firm* — Norton Rose Fulbright Canada LLP

(57) ABSTRACT

A misalignment tolerant foreign object detection approach is proposed for use with wireless charger systems where sensor coils or portions thereof are mirrored about one or more axes of radial symmetry. A first variant is proposed adapted for x-axis misalignment tolerance, and a second variant is proposed for simultaneous x and y axis misalignment tolerance. Further variants are proposed with additional rotational misalignment tolerance. Detection of the foreign object despite misalignment in receiver and transmitter coils is an important safety and efficiency consideration.

20 Claims, 23 Drawing Sheets

(51) Int. Cl.
  *G01D 5/20* (2006.01)
  *H02J 50/10* (2016.01)
  *H02J 50/90* (2016.01)

(56) References Cited

U.S. PATENT DOCUMENTS

| | | | |
|---|---|---|---|
| 2020/0259369 A1* | 8/2020 | Stingu | H02J 50/50 |
| 2020/0290467 A1* | 9/2020 | Gao | H04B 5/79 |
| 2021/0057941 A1 | 2/2021 | Wang et al. | |
| 2021/0175756 A1* | 6/2021 | Tachiwa | H02J 50/10 |
| 2022/0278562 A1* | 9/2022 | Judson | H02J 50/10 |
| 2022/0416588 A1* | 12/2022 | Mao | H02J 50/80 |
| 2023/0031837 A1* | 2/2023 | Bayat | H02J 50/90 |
| 2023/0084679 A1* | 3/2023 | Lee | H02J 50/10 |
| | | | 320/108 |
| 2025/0030275 A1* | 1/2025 | Kanakasabai | H02J 50/80 |

OTHER PUBLICATIONS

Thai et al., "Symmetric Sensing Coil Design for the Blind-Zone Free Metal Object Detection of a Stationary Wireless Electric Vehicles Charger," IEEE Transactions on Power Electronics, vol. 35, No. 4, pp. 3466-3477, Aug. 19, 2019 (Aug. 19, 2019), [online] [retrieved on Oct. 26, 2023 (Oct. 26, 2023)], Retrieved from the internet: https://ieeexplore.ieee.org/document/8807237.

* cited by examiner

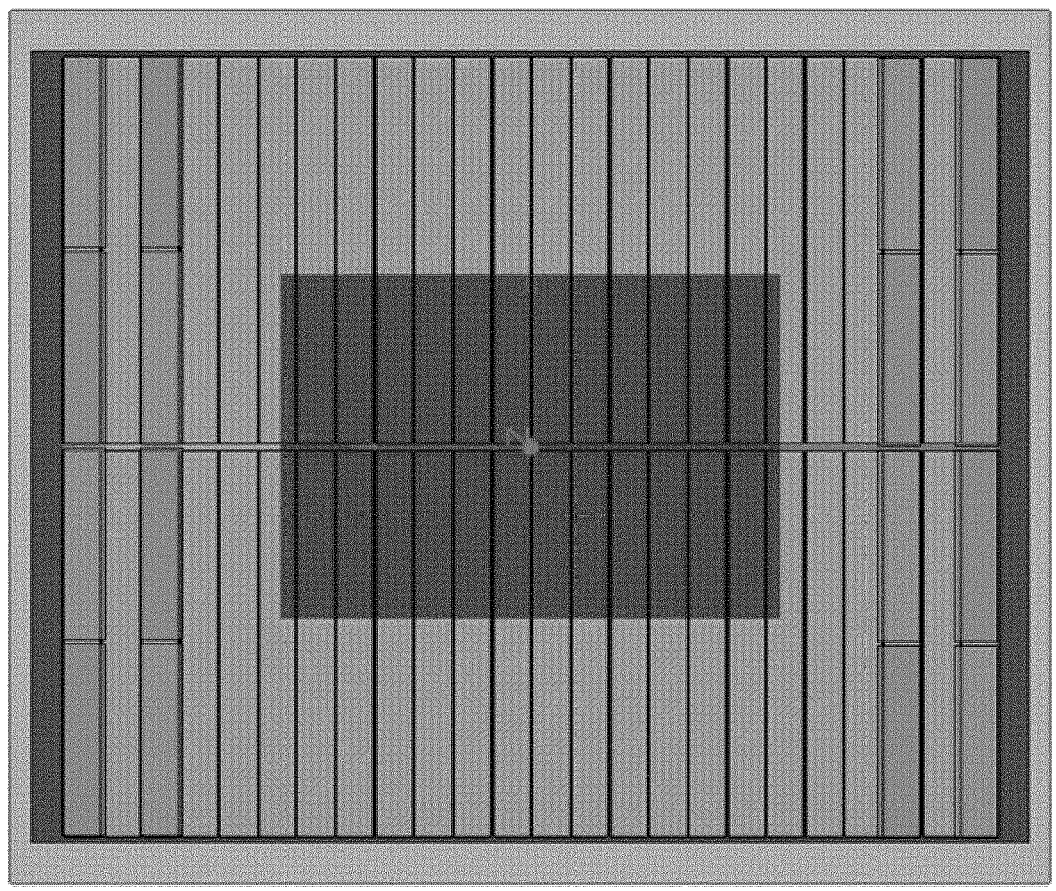
FIG. 10
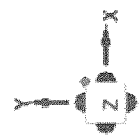

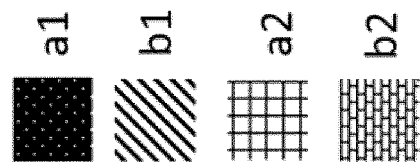
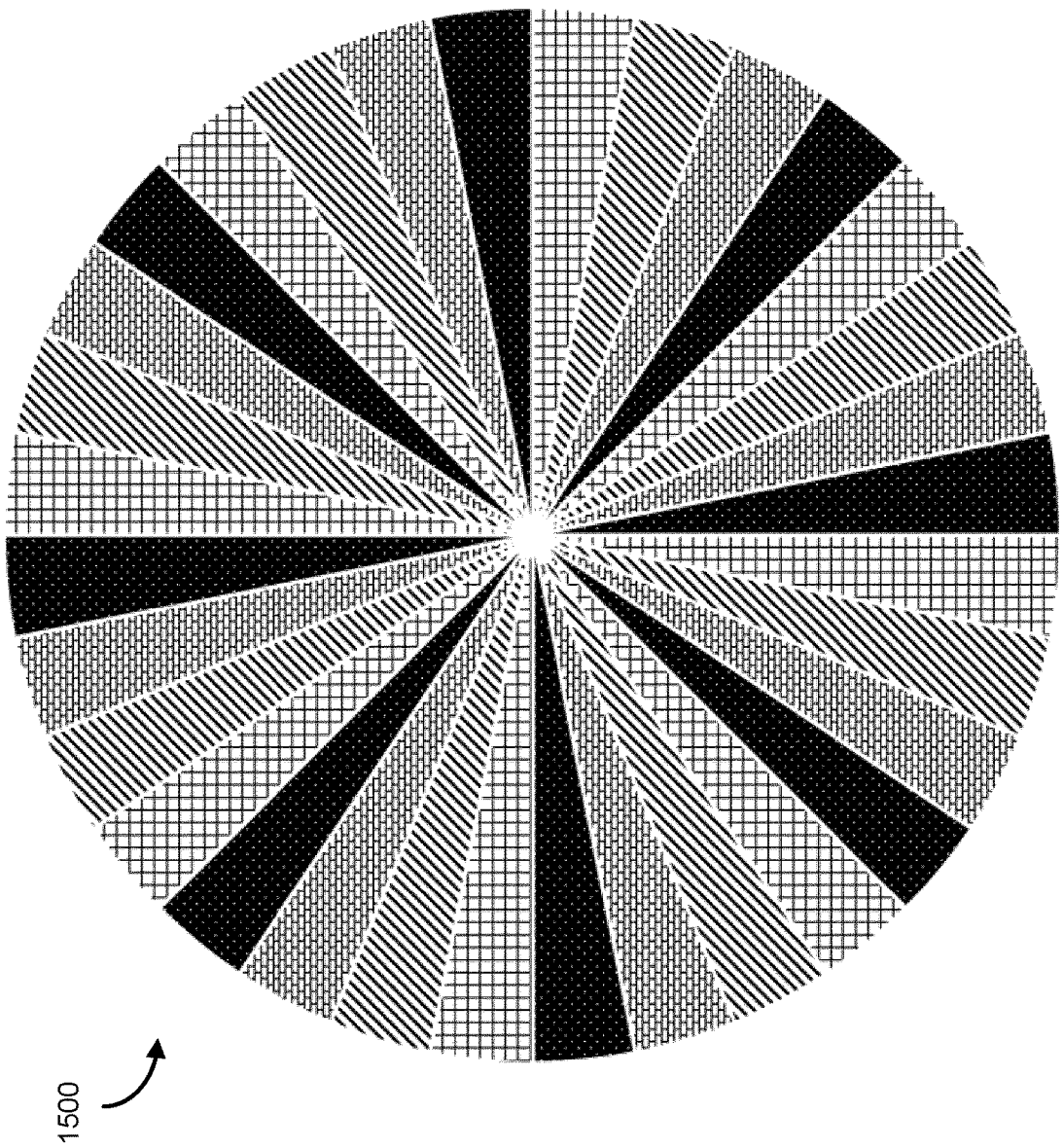
FIG. 15

SYSTEM AND METHOD FOR WIRELESS CHARGING FOREIGN OBJECT DETECTION

CROSS-REFERENCE

This application is a non-provisional of, and claims all benefit, including priority to, U.S. Application No. 63/416,352, entitled "SYSTEM AND METHOD FOR WIRELESS CHARGING FOREIGN OBJECT DETECTION", filed 14 Oct. 2022. This document is incorporated by reference in its entirety.

FIELD

Embodiments of the present disclosure relate to the field of wireless charging and more specifically, embodiments relate to devices, systems and methods for foreign object detection (FOD) that are misalignment tolerant.

INTRODUCTION

In a wireless charging system, it is important to detect the presence of metal objects to avoid overheating of them due to eddy losses generated by the magnetic field of the transmitter coil. Previous approaches use an array of symmetrically placed coils for the detection of the metal object. The voltage difference between complementary pairs of coils is measured and compared with previous measurements. The presence of the metal object changes the induced voltage across the sensor coil that is facing the metal object. If any deviation from previously measured differential voltages between complementary coils is detected, the FOD system will trigger, and the metal object will be detected.

A challenge with existing FOD methods is that they fail to operate under misalignment conditions due to unsymmetrical design with respect to the misalignment of the coils. While reduced or zero-emission electric vehicles are desirable as their adoption would help to resolve or mitigate environmental impacts and/or conserve the natural environment or natural resources relative to internal combustion engines, a challenge faced is that in an EV wireless charging application, misalignment of the charging pads is inevitable due to driver inaccuracy.

Accordingly, an improved FOD system is desirable.

SUMMARY

An improved foreign object detection (FOD) sensor coil approach is proposed that is robust against the misalignment of the wireless charging system (e.g., receiver and transmitter not aligned), according to various embodiments. Misalignment is a practical problem that arises in commercial implementations, and causes problems with FOD systems when operating under non-ideal alignment conditions. As described herein, the improved approach includes a circuit layout/topology that can be incorporated into a FOD system, along with specific control approaches, and detection methodologies. The improved FOD system can be a standalone circuit for coupling to one or more wireless charging pads, or it can include one or more wireless charging pads coupled to the FOD system to receive various signals therefrom. The FOD system can be coupled to a transmitter pad or a receiver pad, or both. The transmitter pad, for example, can be embedded into a parking spot, and a receiver pad, for example, could be embedded into an electric vehicle to be charged. The improved FOD system identifies differential voltages and/or currents and the geometry/positioning of the elements yields detection capabilities despite certain types of misalignments. The improved FOD system can trigger a state change in operation, for example, reducing power transfer, turning on a thermometer, shutting down operation, issuing an alarm (audible, notification), and these state changes can be based on characteristics of the detected differential voltage and/or currents (e.g., different thresholds for different state changes).

Misalignment tolerance for FOD is important because wireless charging efficiency and safety is impacted by the presence of certain foreign objects, and it is important to be able to identify the presence and/or characteristics of the foreign object despite some level of misalignment. Misalignment can occur, for example, when an electric vehicle is not positioned directly over a receiver pad in a parking spot. The danger of foreign objects is that they can cause impacts on power transfer, reducing efficiency, or potentially absorbing energy. This can lead to increased heat, yielding a safety hazard (e.g., heating an object up that hurts a person picking up the object) or a thermal hazard (e.g., melting). A foreign object can be accidentally placed or fall into the path of the wireless charging (e.g., coins falling out of pocket).

Upon foreign object detection, the improved FOD approach can produce data sets or a signal indicative of a foreign object (or in some embodiments, a foreign object greater than a threshold size or a foreign object having threshold characteristics), can be utilized to conduct mitigation measures, such as a reduction of power transfer (e.g., by establishing a limit until the foreign object is detected to no longer be there), a shutoff (e.g., a temporary shut off until the foreign object is detected to no longer be there), an alarm signal, or combinations thereof.

The foreign object detection circuit can be provided in different topologies. The topologies described herein can include a set of sensor coils positioned relative to charging coils of a wireless transmitter, the set of sensor coils including a first sensor coil set $a_1$ and a second sensor coil set $b_1$ that are positioned from one another relative to a plane of operation of the wireless transmitter. The coil sets can be geospatially configured such that their positioning is mirrored about one or more axes of radial symmetry (e.g., diagonally), such that $a_1$ and $b_1$ are mirrored.

More complex variations are also described. In a variant embodiment, the sensor coil sets are a and b whereas the sensor coils are $a_1$, $b_1$, $a_2$, $b_2$, $a_3$, $b_3$, etc. which can consist of multiple portions. The sensor coils are compared in pairs to obtain multiple differences $a_1$-$b_1$, $a_2$-$b_2$, etc. between the two sets.

At least one comparator (e.g., a comparator circuit) can be coupled to coils in the first sensor coil set and coils in the second sensor coil set to determine differential voltages/currents between voltages/currents of coils in the first sensor coil set a and the second sensor coil set b. The comparator circuit can be a potentiometer or a series connection of two constant resistors, for example. A multiplexer circuit or multiple analog-to-digital converters (ADCs) can be used as alternatives, and the use of a multiplexer would reduce the number of ADC channels required. The multiple ADCs within a microcontroller can, in this example, be used to sense the signals, and then the signals are processed within the microcontroller. Variations herein can be utilized by the comparator for electrical characteristic sensing.

Due to the radial symmetry, changes in induced voltage in the first sensor coil set $a_1$ and the second sensor coil set $b_1$ due to the misalignment of the transmitter coil and the receiver coil are compensated due to the diagonal positioning of the first sensor coil set $a_1$ and the second sensor coil set $b_1$ relative to one another, and a level of robustness against misalignment is established by way of the configuration.

Different variations provide differing levels of robustness against misalignment in different axes. For example, in a first variant, having a first set $a_1$ and a second set $b_1$ may protect against one of x or y axis misalignment. However, in further variants, where additional portions are established in the sets, there can be simultaneous protection against both x and y axis misalignment. Adding different axis of symmetries, a rotational misalignment can also be covered. The rotational misalignment is the case where there is a misalignment angle between one edge of the transmitter and receiver (instead of being in parallel).

A number of further variations are described herein in respect of determining a number of portions and widths of the system based on desired characteristics, such as a target voltage sensitivity of the differential voltage.

The approach herein can be used not only for electric automobiles, but can be used for other electric vehicles, such as drones, cargo/cruise ship charging, autonomous underwater vehicle (AUV), automatic guided vehicles (AGV), and/or autonomous wheelchair charging. The transmitter pad need not be fixed in a position, in some embodiments, the transmitter pad can be moved to mate with a receiver pad, for example, the transmitter pad being held on an arm and mobile.

The approaches described herein are useful for encouraging and improving the adoption of electric charging infrastructure, which supports improved green technologies to help mitigate environmental challenges. Increased adoption of electric vehicles improves the rate at which a transition to less polluting technologies is possible.

It is important that the electric charging infrastructure includes safeguards to improve safety and/or maintain charging efficiency despite misalignments between transmitter and receiver pads.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 10 is a schematic showing an extended foreign object detection system with more axes of symmetry, according to some embodiments.

FIG. 15 is an illustrative diagram showing a circular sensor coil structure, according to some embodiments.

DETAILED DESCRIPTION

Figure 1:
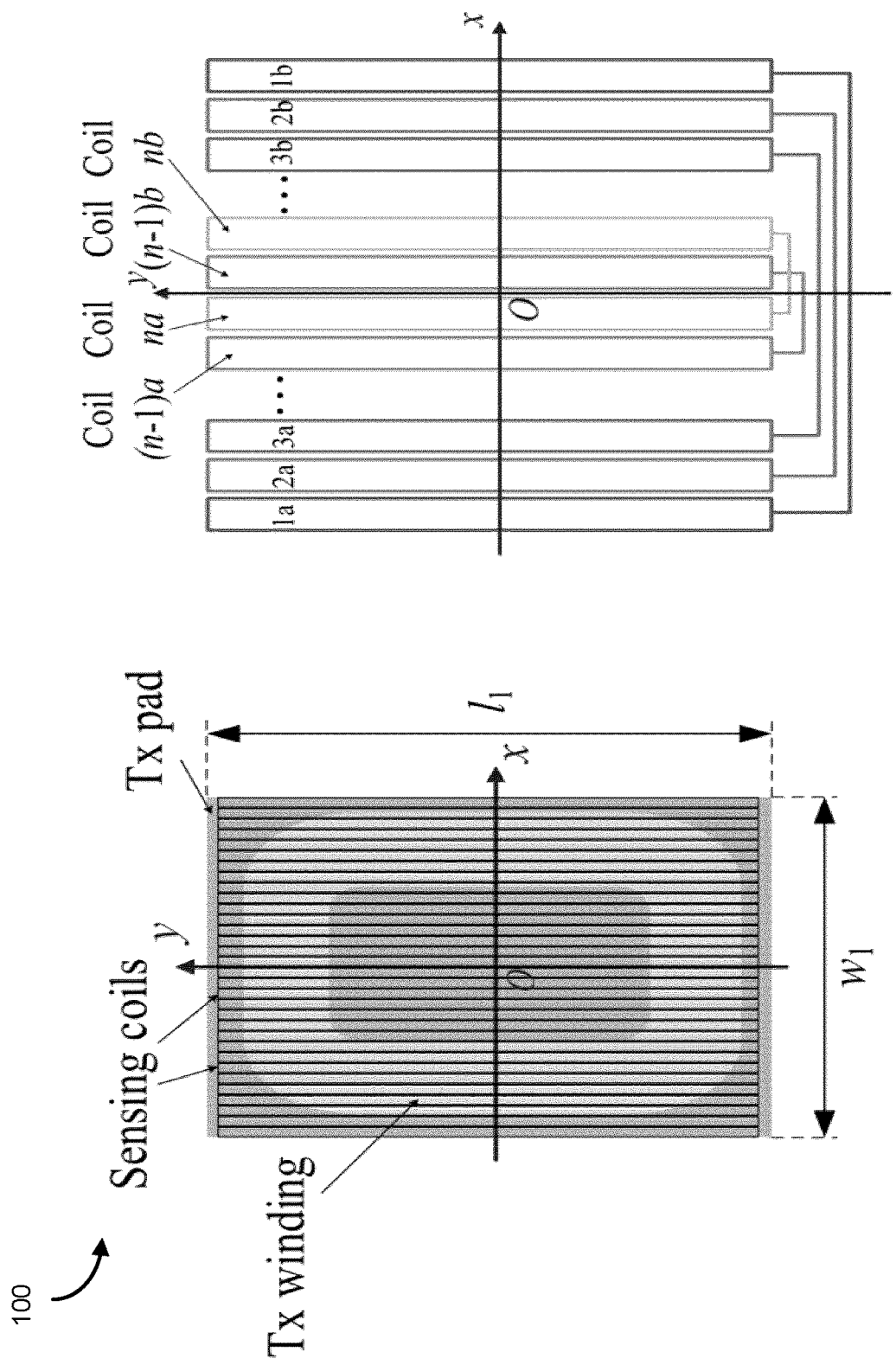
FIG. 1 is a schematic showing a blind-zone free foreign object detection system.

An improved foreign object detection (FOD) sensor coil approach is proposed that is robust against the misalignment of the wireless charging system, according to various embodiments.

As described herein, the improved approach includes a circuit layout/topology that can be incorporated into a FOD system, along with specific control approaches, and detection methodologies. In operation, the foreign object detection system approach can be utilized to perform a method for detecting of one or more foreign objects. The method is conducted temporally before wireless charging starts (e.g., when the wireless charger is activated but before charging begins). This can be done immediately before charging as a pre-requisite to charging, or it can be done periodically. The reason for this is to check for foreign objects that could be present (and potentially impart an efficiency or a safety concern).

Efficiency and safety can be coupled together, for example, as a foreign object in the charging path could inadvertently receive energy, become heated, and thermally damage (e.g., melt) the wireless charger, the device being charged, or a housing of the wireless charger. As a practical example, this can include a wireless charging enabled parking spot where a metal plate has fallen from a grating. If the wireless charging commences, the plate could heat up, and ultimately melt the wireless charging pad or damage the surrounding asphalt. It is challenging to detect foreign objects when the transmitter coil and the receiver coil are misaligned (which can occur in the context of a parking spot wireless charging due to offset alignment of vehicle and parking spot).

Upon foreign object detection, the improved FOD approach can produce data sets or a signal indicative of a foreign object (or in some embodiments, a foreign object greater than a threshold size or a foreign object having threshold characteristics), can be utilized to conduct mitigation measures, such as a reduction of power transfer (e.g., by establishing a limit until the foreign object is detected to no longer be there), a shutoff (e.g., a temporary shut off until the foreign object is detected to no longer be there), an alarm signal, or combinations thereof.

The foreign object detection circuit can be provided in different topologies. The topologies described herein are proposed in a number of variants having differing levels of complexity that yield particular additional improvements, such as robustness across multiple axes simultaneously or against rotation misalignment. Specific approaches are also described in relation to different widths and portions used to achieve different operational characteristics.

In a wireless charging system, it can be important to detect the presence of metal objects to avoid overheating of them due to eddy losses generated by the magnetic field of the transmitter coil. In alternate approaches, an array of symmetrically placed coils is used for the detection of the metal object. The voltage difference between complementary pairs of coils is measured and compared with previous measurements. The presence of the metal object changes the induced voltage across the sensor coil that is facing the metal object. If any deviation from previously measured differential voltages between complementary coils is detected, such an FOD system will trigger, and the metal object will be detected.

In particular, a proposed method includes first applying an auxiliary high frequency voltage on the sensor coils. The auxiliary high frequency voltage can be defined, for example, in the range of a few MHz. The frequency range of 3 MHz is selected because of its higher sensitivity and ease of implementation. Other frequency ranges, such as 1-6.8 MHz, are possible. The method then includes sensing one or more voltages or currents using a set of sensor coils positioned relative to the charging coils of a wireless transmitter, the set of sensor coils includes a first sensor coil set and a second sensor coil set that are mirrored about one or more axes of radial symmetry from one another relative to a plane of operation of the wireless transmitter. The sensor coils are positioned on top of the charging coils of a wireless transmitter. Each of the sensor coil sets, for example, can include 12 pairs, as shown in an example described herein. Other numbers of pairs are possible, and 12 pairs is used as an exemplary, non-limiting example.

Typically, the voltages or currents are being sensed continuously to detect the presence of a foreign object, such as an aluminum can, in a practical scenario. The sensor coils are then operated to determine differential voltages or currents based on at least one or more voltages or currents. A differential voltage or current is identified (e.g., as between the first sensor coil set and the second sensor coil set), and an example in a practical scenario could be 0.2 V in one sensor coil set and 0.3 V in the other sensor coil set. The difference between the two sets is 0.1 V which indicates the presence of a metal object.

Because the coil sets are mirrored about the axes of radial symmetry, the differential voltage or current is useful despite misalignment because the voltages would be equal if there is no metal object on the sensor coils. In case of misalignment, since both sets face similar magnetic fields due to the symmetry of the sensor design, no offset will be added to the measured voltages of the coil sets.

However, in an example inferior design, one of the coil sets will be shifted up due to misalignment and disrupts the detection solution (e.g., the detection algorithm fails to work properly due the physical misalignment). In this example, one coil can be 1.2 V, and the other coil set is 0.3 V. It can be seen that the differential voltage, in this case, cannot be used to detect the presence of the metal object because this sensor design cannot distinguish between the misalignment and metal object effect on the differential voltage.

In particular, changes in coil or auxiliary load voltage or current in the first sensor coil set and the second sensor coil set due to the misalignment of the transmitter coil and the receiver coil are compensated due to the positioning of the first sensor coil set and the second sensor coil set relative to one another. The term compensation means symmetrical placement relative to the transmitter and receiver misalignment axis in this context. This approach is able to handle a misalignment of 200 mm range for EV charging applications and provides a technical improvement over other approaches because of an enhanced ability to operate despite misalignment. As noted above, other approaches were inadequate because of the misalignment effect on the sensor coil voltages and malfunction in their ability to detect metal objects, and this could lead to major safety issues or require expensive workarounds.

The proposed approaches, while requiring additional upfront investment, provides an elegant approach to addressing safety/efficiency issues and providing a practical application for an improved FOD design where the geospatial orientation and an improved operation method are proposed to operate in tandem. The approach is grounded in physical, practical embodiments, such as a wireless charger that is embedded or coupled into a parking spot. While not limited to electric vehicles specifically, this approach could help with increased adoption of green technologies by reducing a friction point associated with charging and range anxiety, as a driver could conveniently charge a vehicle while, for example, running errands, without having to take steps to physically connect a wired charger, etc. However, for wireless charging at high power, it is important to design systems that are resilient to practical non-idealities, such as misalignments that are caused by inaccurate coupling as between transmitter and receiver.

Upon determining the differential voltages or currents (e.g., greater than a threshold of 5% or any other value that can be set by the designer), a practical application is that the system can issue an alarm notification (which can be a physical alarm, such as a ringing noise or an electronic signal to trigger a notification) to request that the wireless charger be inspected for a foreign object, or trigger a control element, such as an actuator arm coupled to a motor, etc., to attempt to sweep the foreign object away. In some embodiments, the wireless charging is not permitted to commence until the system re-checks and issues an "all clear" signal. In another variation, the wireless charging is permitted to commence, but at a reduced power level, such as 1%-10% of the nominal power, and the wireless charger can be configured to periodically check for foreign objects and return to full power when an "all clear" signal is issued.

A typical check for foreign objects takes in the order of 100 milliseconds. In a further variation, the system is coupled with additional safety sensors, and the foreign object detection system is an input into a controller circuit that uses a combination of inputs in controlling operation of the wireless charger. The alarm notification can be used to trigger safety mechanisms, such as controlling an actuator for a sweeping arm in an attempt to clear the object, or reductions in power delivery. In a further embodiment, the alarm notification can be used to automatically switch on or off power delivery entirely.

In an EV wireless charging application, misalignment of the charging pads is inevitable due to driver inaccuracy. For instance, a driver may not park perfectly aligned over a charging pad. These alternate FOD methods and approaches fail to operate under misalignment conditions due to unsymmetrical design with respect to the misalignment of the coils.

Existing alternate approaches make use of a grid approach, for example. Consider an X and Y axis, these systems may have sensors at (1,1), etc., and measure flux at each point which results in an image, which can then be used in some form of image recognition. The image recognition can determine if it matches a normal flux pattern. These existing alternate approaches have various problems for which technical improvements are desirable. For instance, in alternate approaches, it needs to be assumed that the field is symmetrical, and if a receiving coil is shifted in any direction, it moves that field, and could be rendered useless.

By designing the sensor coils to be symmetrical (e.g., mirrored) with respect to the misalignment direction, in some embodiments, the proposed FOD system can operate despite certain types of charging coil misalignment (e.g., in some axes, or in multiple axes simultaneously, or alongside rotation). The approaches described herein overcome some of the challenges in earlier approaches that can arise, for example, due to misalignment. A number of different variations are proposed herein that have different misalignment tolerances and changes in complexity in design.

There are different types of misalignment: for example, if the symmetry is left and right (x axis) or if misalignment is shifted up and down (y-axis).

In a proposed variant, more axes of symmetry are proposed to be added, and because they may be symmetrical, there is a net difference of zero (or if there are non-idealities, a small net difference), but if there is a foreign object on the charging pad, the system may still detect the object. Having multiple axes of tolerance is helpful, depending on the particular situation and practical tendencies for misalignment (e.g., parking spots most likely have most misalignment in one direction, and some misalignment in another direction). As noted herein, sometimes the misalignment in a practical scenario may also be in respect of rotational misalignment as well.

In an embodiment, the system may be split into four quadrants with a pair of coils in each quadrant that can be compared to. In some embodiments, the pair of coils may not be side by side, and instead staggered, so that the system may be able to detect a foreign object in the middle.

Existing FOD sensor coil layouts are sensitive to the misalignment of the transmitter and receiver coils of the wireless charging system. This is due to asymmetric design with respect to the misalignment axes.

The proposed FOD system, presented according to some embodiments, uses sensor coils that are configured to exploit symmetry, for example, across the x and y-axes. The sensor coils are designed in sets that are placed from each other in some embodiments, such that there can be one or more axes of radial symmetry between sensor coils or paired sensor coil portions. As described herein, the proposed FOD system may be symmetrical to one or both of the x and y axes to the misalignment which may make it robust against misalignment of the wireless charging coils.

In experimental analysis, it is suggested that the system of some variations achieves improved performance (e.g., reduced differences) between the aligned and misaligned operating conditions. This increases the sensitivity of the system to the presence of the foreign object (e.g., a metal object). Although the number of coils in series may increase, the sensitivity of the sensor coils can also be controlled by changing the width of each coil part. Relative to alternate FOD sensor approaches, a number of the printed circuit board (PCB) layers may be similar to alternate FOD sensor approaches and therefore, no extra cost is added to the system in some instances.

Wireless Power Transfer and Foreign Objects

Wireless power transfer (WPT) based on inductive coupling is a convenient, safe, and reliable technology to charge electric vehicles (EVs) [2]. In this technology, the transmitter side of the charging system is excited with a high frequency voltage, generated by the inverter [3]. The inverter frequency for EV charging application can be set to 85 kHz band according to SAE standard [4]. The rectangular high-frequency voltage generated by the inverter passes through a resonant network to compensate for the reactive power of the magnetic couplers to improve the efficiency and reduce the volt-ampere requirements of the inverter [5, 6]. The magnetic coupler is a set of transmitter and receiver coils that are electromagnetically coupled when they are placed close to each other. The excitation current on the transmitter coil creates an alternating magnetic field that induces a voltage on the receiver coil. This voltage is rectified by a diode bridge or an active rectifier to supply the load [7].

Due to the presence of an alternating magnetic field in between the transmitter and receiver coils, different standards are developed to protect nearby foreign and live objects [4]. The magnetic field in the charging area results in generating an eddy current in nearby metal objects. This eddy current results in power loss which is known as the eddy current loss.

If the metal object remains inside the magnetic field, the temperature of the object will be increased significantly due to the eddy loss. When the object heats up, it can potentially damage objects or hurt people that come close or in contact with the metal object, for example. If the object heats up, it can also heat up sufficiently to melt nearby objects or damage surfaces.

Therefore, technical solutions are required to detect the metal object and prevent the object from heating up by shutting down the wireless charging system. Several methods are proposed, according to some embodiments, to detect metal objects for EV wireless charging applications. These approaches can ultimately aid in improving user, bystander, and property safety.

Three different groups of foreign object detection (FOD) systems can be considered: parameter detection, sensor-based, and sensing pattern-based methods [8, 9].

In the parameter-based methods, the values of the system parameters such as the self-inductance of the main wireless charging coils [10], input power, efficiency, coil currents [11], and input phase angle are measured and compared with the normal operation state of the system. Any mismatch between the measured values and initial values of the system parameters can be interpreted as the presence of the metal object inside the magnetic field of the wireless charger. Since no extra component is added to the system, this method is a simple and low-cost solution for metal detection.

However, this method is only suitable for a low-power wireless charging system where the metal object dimensions are relatively close to the dimensions of the magnetic couplers [8]. Otherwise, the effect of the metal object on the system parameters will be negligible and the metal object will be undetectable.

The second group of metal detection methods is based on sensor measurements such as pressure, radar, camera, thermal camera, and temperature [8]. The advantages of this group are: detection is independent of wireless charging coil misalignment, detection does not require transmitter side generated magnetic field, sensitivity is high [8], and both metal objects and live objects can be detected [12]. For instance, a thermal camera can combine both metal object detection and live object detection features [13]. However, in this method, the metal objects are undetectable when they are not heated up. In other words, the metal object cannot be detected unless the charging starts. In [12], hyperspectral imaging is proposed to distinguish metal objects from non-metal objects before the metal objects heat up. However, this method cannot detect metal objects when they are fully covered. Moreover, the cost of the sensors and additional computation power are the main drawbacks of the sensor-based metal object detection methods.

The last group of metal object detection that can be considered for the EV wireless charging application is the pattern-sensing-based methods. This method can be categorized into passive measurements and active measurements [14]. In the passive measurements, an array of detection coils is placed on top of the wireless charging transmitter coil. The introduction of the metal object to the system results in changes in the induced voltages on the sensor coils compared to the normal operation of the system. The main disadvantage of this method is the blind regions on the transmitter plane where the transmitter's generated magnetic field is parallel to the sensor coils. In these regions, the metal object will not significantly change the sensor coil's induced voltage and so it cannot be detected. In the active measurement methods, an alternating signal is applied to the sensor coils, and the impedance, phase angle, and/or the amplitude of the voltages on the sensor coils can be measured to detect the presence of the metal object [14]. Compared to the passive measurements, the operation of the sensing coils is not dependent on the transmitter's magnetic field. Therefore, the presence of the metal object can be detected before starting the charging process.

In [15], a two-layer non-overlapping coil set for FOD is proposed. This method is based on the detection of changes in mutual inductance between the sensor coils and the main transmitter coil. Unfortunately, the misalignment of the wireless charging coils in this design results in higher induced voltage on one side of the FOD sensor coils due to the uneven distribution of the magnetic field. Therefore, this design cannot detect metal objects when the WPT system is operating under misalignment. In addition, because of using a multilayer coil structure, a large area is covered by the coil trace copper which results in more eddy current loss in the sensor coils. In [1, 16], a symmetrical coil layout (with respect to the center of the transmitter) with a similar approach is used to eliminate the blind zones in the middle of the transmitter. This type is robust against x-directional misalignment. However, these methods are also not suitable for operation under high misalignment of the wireless charging coils in both the x and y directions.

Proposed Misalignment-Tolerant Approaches

Presented herein, according to some embodiments, is a new symmetrical (with respect to the misalignment) sensor coil layout, proposed to solve the aforementioned issues regarding the misalignment of the wireless charging coils. In some embodiments, this FOD system is based on passive pattern-sensing-based methods, but active approaches are also possible.

First, the operation principle of the symmetrical FOD structure is studied and the effect of misalignment is analyzed. Second, the proposed symmetrical layout, according to some embodiments, is illustrated and analyzed through simulations and experiments.

It is shown herein that certain variants of the proposed layout is robust against misalignment of the wireless charging coils, and provides a technical solution to the described problems with existing methods.

Operation Principle

In [1], a blind-zone-free FOD system based on a non-overlapping sensor coil with a symmetric layout is proposed as shown in FIG. 1. FIG. 1 is a schematic showing a blind-zone-free foreign object detection system 100. However, in the design shown in FIG. 1, one of the coil sets will be shifted up due to misalignment and disrupts the detection algorithm. In this example, one coil can be 1.2 V, and the other coil set is 0.3 V. It can be seen that the differential voltage, in this case, cannot be used to detect the presence of the metal object because the conventional sensor design cannot distinguish between the misalignment and metal object effect on the differential voltage.

It can be seen that the transmitter coil is covered by narrow-width rectangular sensor coils. With no misalignment or metal object between transmitter and receiver coils, the induced voltages on the sensor coils will be symmetrical between each complementary pair of coils. In this situation, assuming the transmitter coil layout is symmetrical, the magnetic field distribution would be symmetrical in both x and y directions. The induced voltage on each sensor coil would be similar to its complementary coil placed symmetrically. Therefore, the voltage difference would be zero under these conditions. Ideally, the differential voltage of each pair of sensor coils, $V_{di}$, can be expressed as:

$$\forall i \in N \; V_{di} = V_{ai} - V_{bi} = 0 \tag{1}$$

where a and b are the sets of coils in the negative and positive x-axis respectively, $N=\{1, 2, 3, \ldots, n-1, n\}$ is the set of the sensor coils as shown in FIG. 1.

When the metal object is placed on any of the sensor coils, the induced voltage of the sensor coil will change. This will cause the differential voltage of that sensor coil pair to deviate from the nominal value, resulting in $V_{di} \neq 0$, which indicates that a metal object is on top of the sensor coil pair i. For instance, if the metal object is on top of coil $a_1$, the induced voltage on coil $a_1$ is different from the induced voltage on coil $b_1$ and so the differential voltage will deviate from zero.

Figure 2:
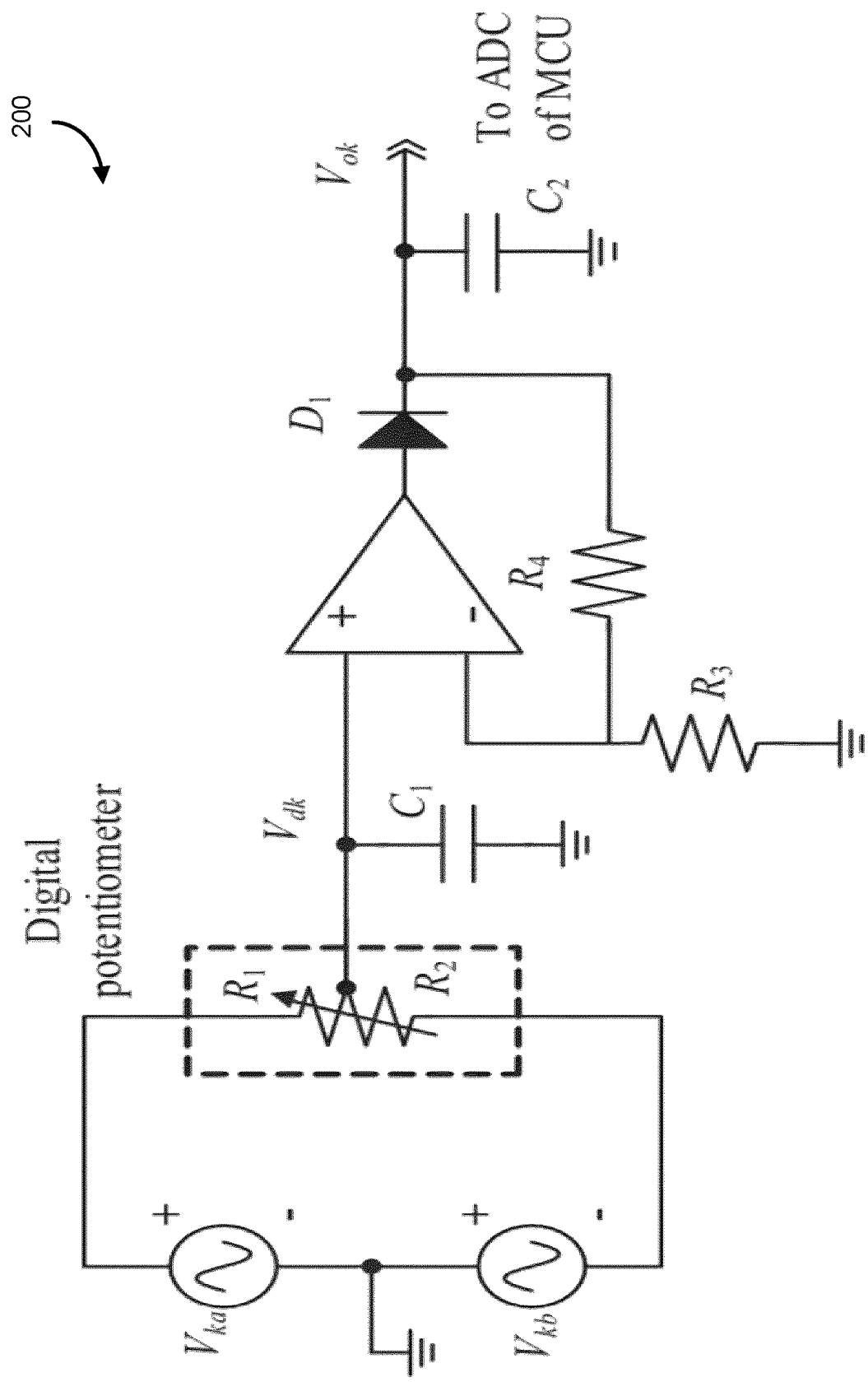
FIG. 2 is a circuit diagram showing a foreign object detection circuit.

FIG. 2 is a circuit diagram 200 showing a foreign object detection circuit. In order to measure all the differential voltages, a detection circuit based on an analog multiplexer is proposed in [1]. In this circuit, each pair of sensor coils is connected to a potentiometer through the multiplexers. The voltage seen on the mid-point of the potentiometer is the differential voltage. Then this voltage is filtered and amplified by a precision rectifier stage. The schematic of this circuit is shown can be seen in 200.

Misalignment Issue

Due to imperfection of the driving skills and practical limitations, misalignment of the wireless charging coils is possible (and possibly inevitable in a commercial, practical embodiment). Thus, operation under misalignment is a key requirement for an EV wireless charging system as it can have safety and efficiency ramifications.

It should be noted that the alternate FOD method is based on changes in induced voltages on the FOD sensor coils caused by the magnetic field generated by the transmitter coil current. Therefore, the orientation of the magnetic field affects the performance of the FOD system significantly. When operating under high misalignment, the magnetic field distribution will be changed and shifted to the direction of the misalignment. Therefore, the induced voltages on the sensor coils from the wireless charging transmitter coil under misalignment will be different from the nominal aligned condition. In this case, an offset value will be added to the differential voltage, and the sensitivity will be reduced.

FIGS. 3A-D are illustrative diagrams showing an alternate approach foreign object detection system under misalignment, according to some embodiments.

Figure 3:
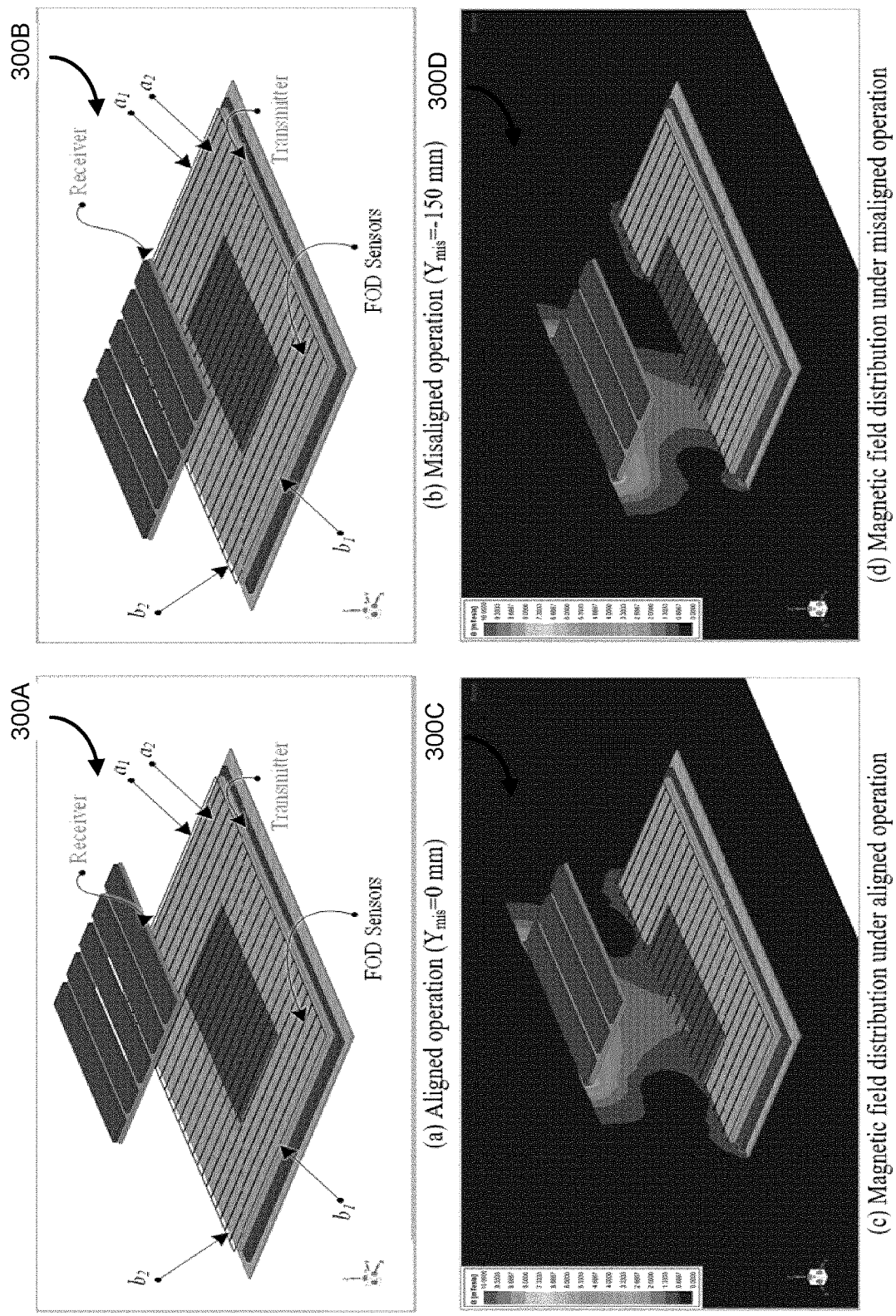
FIGS. 3A-D are illustrative diagrams showing an alternate approach foreign object detection system under misalignment.

The alternate FOD system's normal operation and operation under misalignment are shown in FIG. 3A and FIG. 3B, respectively. As an example, a 6.6 kW wireless charging system is modeled in ANSYS Maxwell™, and the resulting magnetic fields for 300A and 300B are presented in FIG. 3C and FIG. 3D, respectively. It can be seen in 300C and 300D that the magnetic field distribution is significantly affected by the position of the receiver coil. Most importantly, it clearly can be seen that the magnetic field distribution is asymmetrical along the x-axis in case of the operation under y-direction misalignment as shown in 300D.

Proposed FOD System

Figure 4:
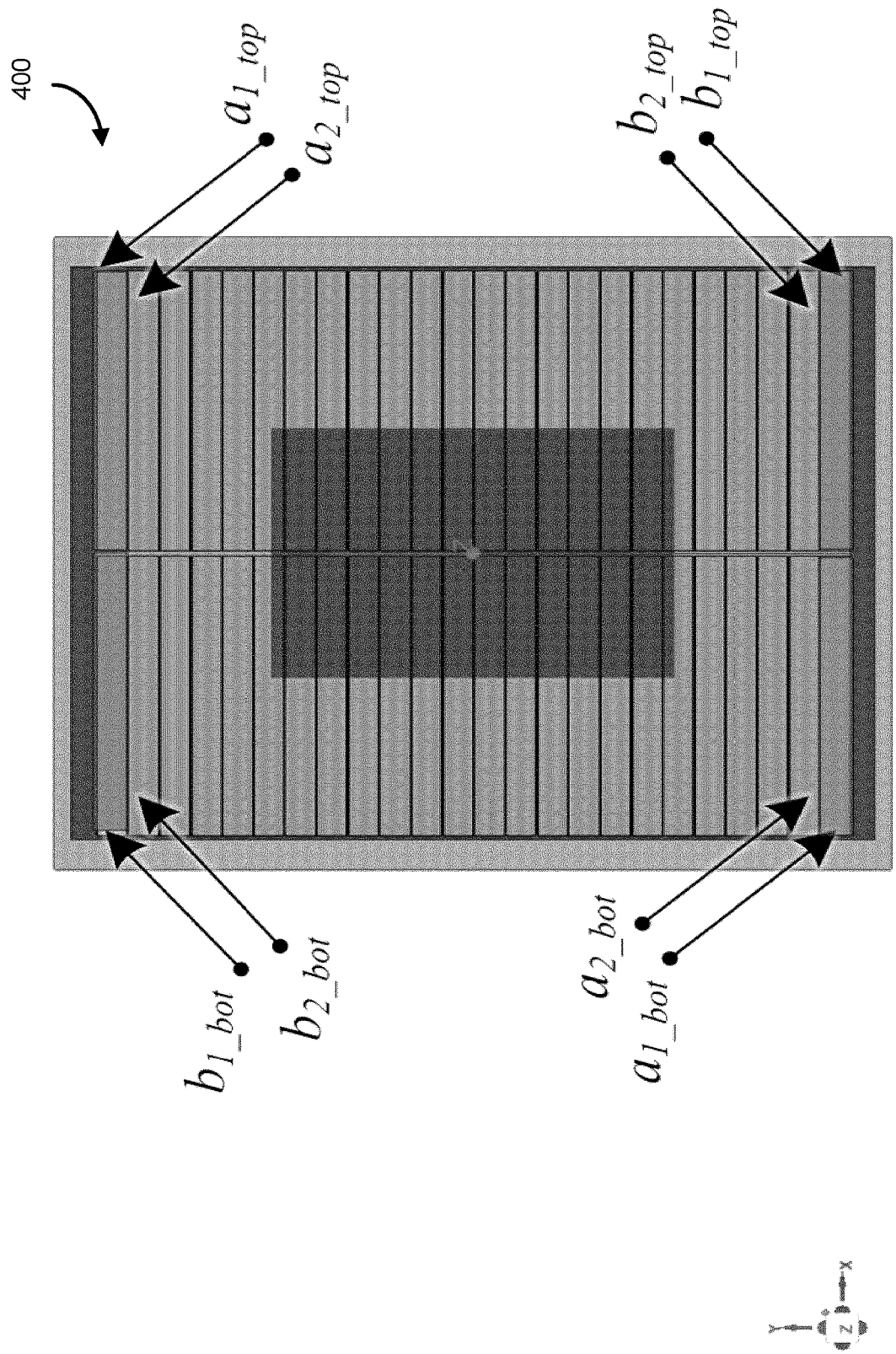
FIG. 4 is a schematic showing a misalignment tolerant symmetrical foreign object detection system, according to some embodiments.

FIG. 4 is a schematic showing a misalignment tolerant symmetrical FOD system 400, according to some embodiments. In the proposed exemplary FOD system 400 each sensor coil may be divided into two parts and placed diagonally as shown. In operation, the foreign object detection system approach can be utilized to perform a method for detecting of one or more foreign objects.

The method is conducted temporally before wireless charging starts (e.g., when the wireless charger is activated but before charging begins). This can be done immediately before charging as a pre-requisite to charging, or it can be done periodically. The reason for this is to check for foreign objects that could be present (and potentially impart an efficiency or a safety concern). Efficiency and safety can be coupled together, for example, as a foreign object in the charging path could inadvertently receive energy, become heated, and thermally damage (e.g., melt) the wireless charger, the device being charged, or a housing of the wireless charger.

As a practical example, this can include a wireless charging enabled parking spot where a metal plate has fallen from a grating. If the wireless charging commences, the plate could heat up, and ultimately melt the wireless charging pad or damage the surrounding asphalt. It is challenging to detect foreign objects when the transmitter coil and the receiver coil are misaligned (which can occur in the context of a parking spot wireless charging due to offset alignment of vehicle and parking spot).

There are wireless transmitter coil(s) that are the main charging coil. The sensor coils of the FOD system 400 are positioned (e.g., placed on top of) in respect of the main charging coil. Sensor coils can be designed in sets of parts. One such set of sensor coils is indicated where the two coil parts are connected in series to make sensor coil set $a_1$. Similarly, another set of sensor coils is indicated where the two coil parts are connected in series to make sensor coil set $b_1$. The voltage difference between coil $a_1$ and $b_1$ may produce a differential voltage that can be used to detect the presence of a metal object.

As noted herein, this is a simplified example and more complex variations are possible, for example, with additional portions for the coils, etc. For example, there can be multiple coil pairs (i.e., $a_1$ vs $b_1$, $a_2$ vs $b_2$, $a_3$ vs $b_3$, etc.). Each coil ($a_1$, $b_2$, $a_2$, etc.) can contain multiple portions (loops) but the coils are taken from sets a and b and are compared in complementary pairs. Some, a combination of, or all of the comparisons can be considered as a whole to determine if a foreign object is on the system or not.

In case of the operation under misalignment, one part of each sensor coil pair may experience the same changes in magnetic field distribution. The differential voltage of each pair of sensor coil sets, $V_{di}$, can be expressed as:

$$\forall i \in N \; V_{di} = (V_{ai\_top} + V_{ai\_bot}) - (V_{bi\_top} + V_{bi\_bot}) \quad (2)$$

Ideally, under nominal conditions without a metal object, the differential voltage, $V_{di}$, should be close to zero. In some embodiments, whenever a metal object is introduced to the system, the voltage of the sensor coil facing the metal object may deviate from the nominal value resulting in a deviation of the differential voltage value from zero.

In particular, the method includes first applying an auxiliary high frequency voltage on the sensor coils. The auxiliary high frequency voltage can be defined, for example, in the range of a few MHz. The frequency range of 3 MHz is selected because of its higher sensitivity and ease of implementation. Other frequency ranges, such as 1-6.8 MHz, are possible. The method includes sensing one or more voltages or currents using a set of sensor coils positioned relative to the charging coils of a wireless transmitter, the set of sensor coils includes a first sensor coil set and a second sensor coil set that are mirrored about one or more axes of radial symmetry from one another relative to a plane of operation of the wireless transmitter. The sensor coils are positioned on top of the charging coils of a wireless transmitter, and this is provided in an example shown in FIG. 4. Each of the sensor coil sets, for example, can include 12 pairs, as shown in the example at FIG. 4.

In a typical operation, the voltages or currents are being sensed continuously to detect the presence of a foreign object, such as an aluminum can, in a practical scenario.

The sensor coils are then operated to determine differential voltages or currents based on at least one or more voltages or currents. A differential voltage or current is identified (e.g., as between the first sensor coil set and the second sensor coil set), and an example in a practical scenario could be 0.2 V in one sensor coil set and 0.3 V in the other sensor coil set. The difference between the two sets is 0.1 V which indicates the presence of a metal object.

Because the coil sets are mirrored about the axes of radial symmetry, the differential voltage or current is useful despite misalignment because the voltages would be equal if there is no metal object on the sensor coils. In case of misalignment, since both sets face similar magnetic fields due to the symmetry of the sensor design, no offset will be added to the measured voltages of the coil sets. However, in a conventional design shown in FIG. 1, one of the coil sets will be shifted up due to misalignment and disrupts the detection algorithm. In this example, one coil can be 1.2 V, and the other coil set is 0.3 V. It can be seen that the differential voltage, in this case, cannot be used to detect the presence of the metal object because the conventional sensor design cannot distinguish between the misalignment and metal object effect on the differential voltage.

In particular, changes in coil or auxiliary load voltage or current in the first sensor coil set and the second sensor coil set due to the misalignment of the transmitter coil and the receiver coil are compensated due to the positioning of the first sensor coil set and the second sensor coil set relative to one another. The term "compensation" can mean symmetrical placement relative to the transmitter and receiver misalignment axis in this context.

This approach is able to handle a misalignment of 200 mm range for EV charging applications and provides a technical improvement over other approaches because of an enhanced ability to operate despite misalignment. As noted above, other approaches were inadequate because of the misalignment effect on the sensor coil voltages and malfunction in their ability to detect metal objects, and this could lead to major safety issues or require expensive workarounds. The proposed approach, while requiring additional upfront investment, provides an elegant approach to addressing safety/efficiency issues and providing a practical application for an improved FOD design where the geospatial orientation and an improved operation method are proposed to operate in tandem.

The approach is grounded in physical, practical embodiments, such as a wireless charger that is embedded or coupled into a parking spot. While not limited to electric vehicles specifically, this approach could help with increased adoption of green technologies by reducing a friction point associated with charging and range anxiety, as a driver could conveniently charge a vehicle while, for example, running errands, without having to take steps to physically connect a wired charger, etc. However, for wireless charging at high power, it is important to design systems that are resilient to practical non-idealities, such as misalignments that are caused by inaccurate coupling as between transmitter and receiver.

Upon determining the differential voltages or currents (e.g., greater than a threshold of 5% or any other value that can be set by the designer), the system can issue an alarm notification to request that the wireless charger be inspected for a foreign object, or trigger a control element, such as an actuator arm coupled to a motor, etc., to attempt to sweep the foreign object away. In some embodiments, the wireless charging is not permitted to commence until the system re-checks and issues an "all clear" signal. In another variation, the wireless charging is permitted to commence, but at a reduced power level, such as 1%-10% of the nominal power, and the wireless charger can be configured to periodically check for foreign objects and return to full power when an "all clear" signal is issued. A typical check for foreign objects takes in the order of 100 milliseconds. In a further variation, the system is coupled with additional safety sensors, and the foreign object detection system is an input into a controller circuit that uses a combination of inputs in controlling operation of the wireless charger.

Compared to the alternate FOD system approach, when there is a misalignment, the changes in the induced voltage on each part of the sensor coil may be compensated by the complementary coil due to the mirrored (e.g., diagonally) symmetric placement of the coils. For instance, in the case of the operation at $Y_{mis}=150$ mm, the induced voltage on coil $b_{1\text{-}bot}$ and $a_{1\text{-}bot}$ may be larger than the nominal condition. In contrast, the induced voltages on $b_{2\text{-}bot}$ and $a_{2\text{-}bot}$ may be smaller than the nominal condition. Therefore, the effect of the misalignment will be canceled out according to (2). Therefore, in case of operation under high misalignment, the performance of the FOD system in some embodiments, will not be affected.

The maximum misalignment that can be applied is dependent on the design of the wireless charger magnetic structure. However, the FOD system is tolerant against the misalignment in a range that the wireless charging system is capable of tolerating.

One practical challenge of the proposed system is sensor PCB design. The traces should be identical between each pair of the sensor coil to result in zero voltage in normal operating conditions. Otherwise, due to unbalanced magnetic field distribution on the sensor loops, the differential voltage will deviate from zero (offset) when no metal object is introduced. However, this offset voltage is constant with small amplitude, that can be eliminated in the post-processing algorithm.

Figure 5:
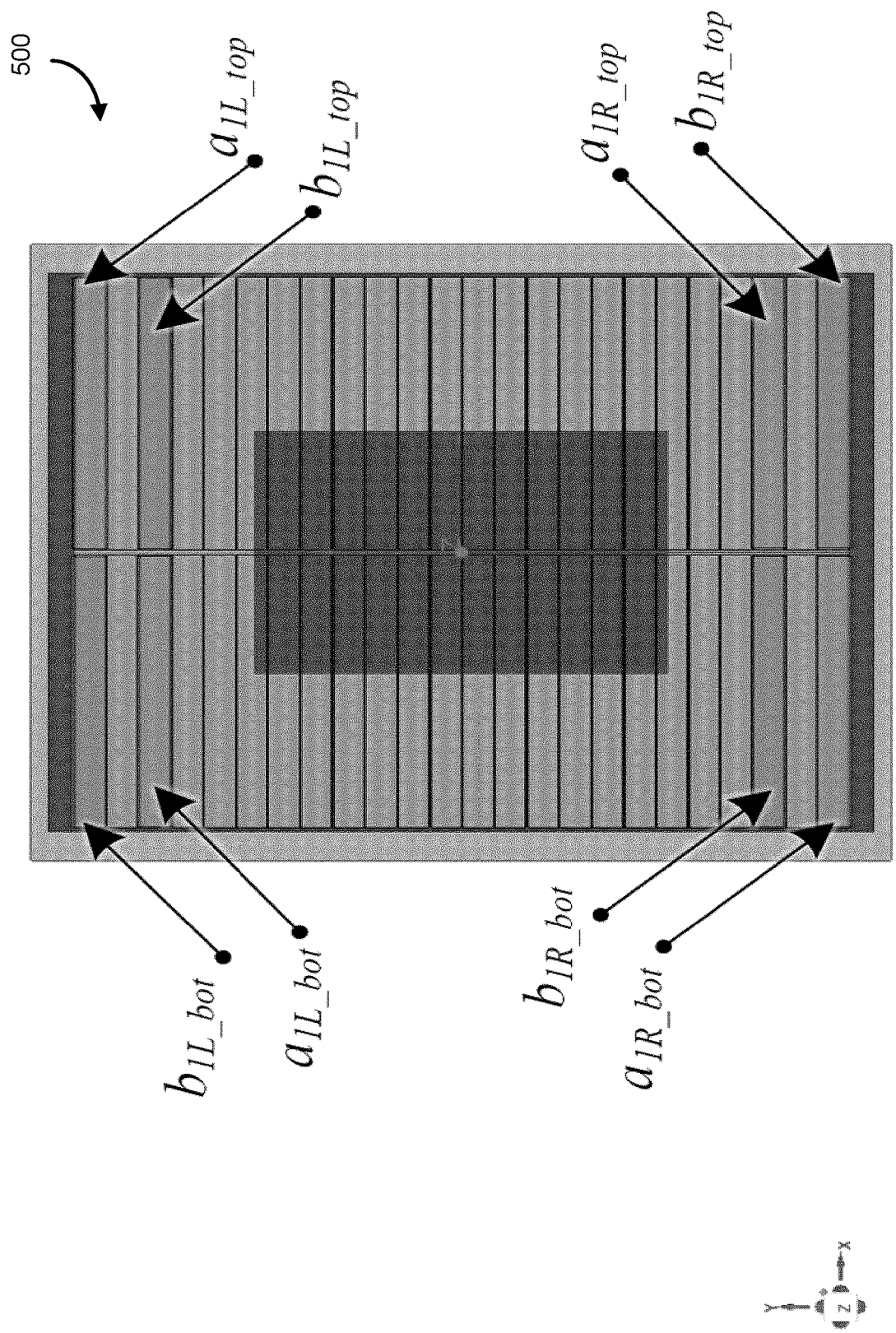
FIG. 5 is a schematic showing a misalignment tolerant symmetrical foreign object detection system, according to some embodiments.

FIG. 5 is a schematic showing a misalignment tolerant symmetrical foreign object detection system 500, according to some embodiments. FOD can be further improved through structural modifications that expand upon the symmetry of other embodiments. Alternate embodiments could exploit further subdivisions of the coil structure, overlaying additional sensor coils, or using larger sets of sensor coils. An example of the latter is shown in FIG. 5. In this exemplary FOD system, each coil set a and b are divided into four parts and placed diagonally. An advantage of this layout over the previously mentioned exemplary layout, according to an embodiment, shown in FIG. 4, is that this layout is symmetrical in case of applying both X and Y-directional misalignment at the same time.

It is possible to put more coils in series, however, the sensitivity of the FOD system may decrease. In order to increase the sensitivity of the system, the width of each sensor coil part may be adjusted (reduced). For instance, when switching from the layout presented in FIG. 4 to FIG. 5, the width of each coil part may be changed to half of the size, and the number of the coil parts may be doubled to maintain a good sensitivity to metal objects. As a non-limiting example, in FIG. 4, the coil width is 30 mm and there can be 20 coils (10 coils per set). Other numbers of coils and widths are possible. For example, in an alternate embodiment, in the layout of FIG. 5, there can instead be 40 coils and a reduced width to 15 mm to maintain a good sensitivity to the metal object.

It is possible to modify the proposed system to an active FOD system. Subsequently, each coil is connected to a resonant circuit and sensing resistors. As the inductance of the sensor coils varies, the voltage of the sensing resistors also changes. The fluctuation in the sensing resistors' voltage or current can indicate the presence of a metal object on the sensor coils.

Simulation Results

Figure 6:
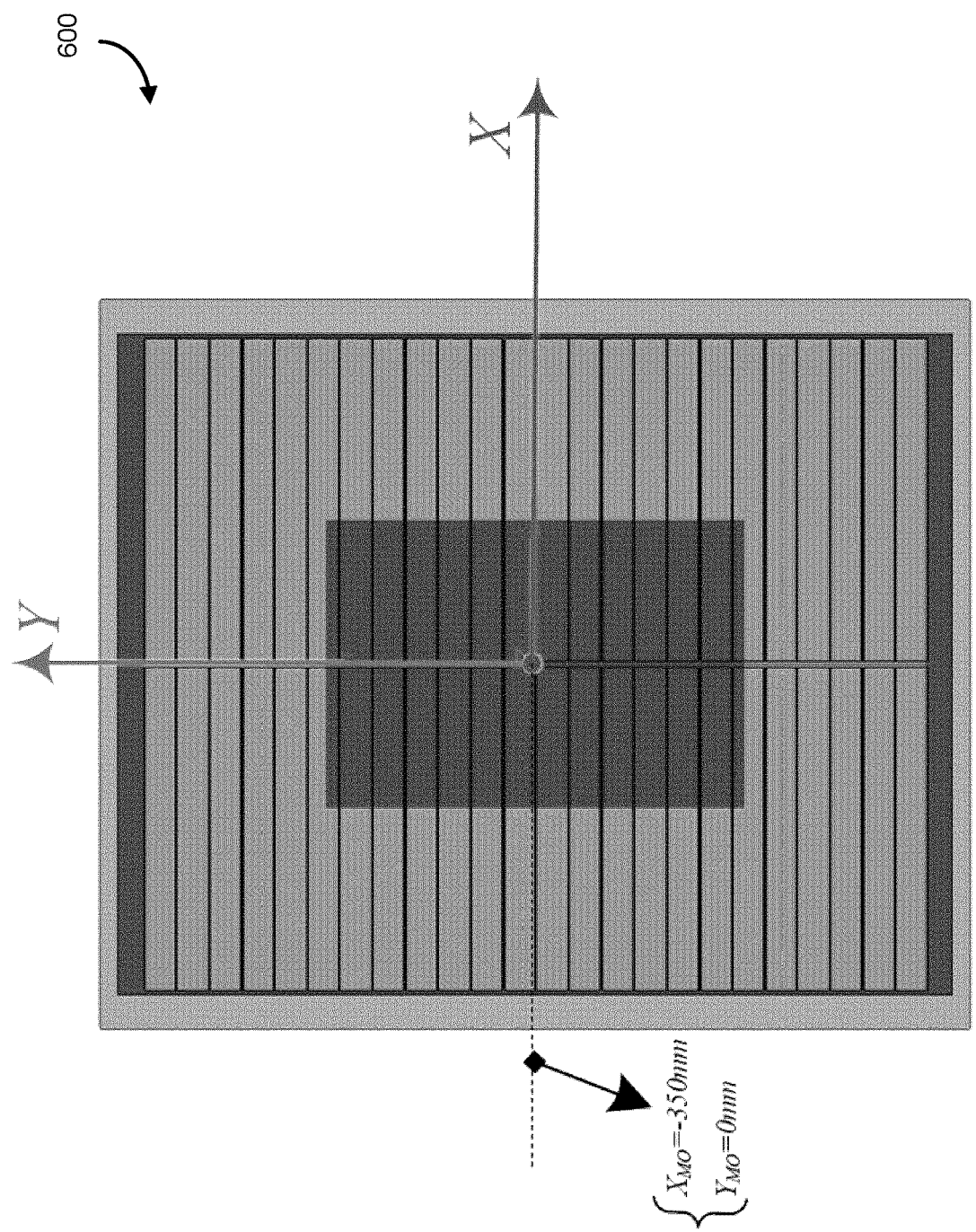
FIG. 6 is a schematic showing the coordinate system defined for the metal object, according to some embodiments.

FIG. 6 is a schematic 600 showing the coordinate system defined for the metal object, according to some embodiments.

A non-limiting exemplary 6.6 kW wireless charging system operating at 85 kHz (according to SAE2954) is considered as a case study. The wireless charging coils are the rectangular type with a dimension of 640×508 mm². Ferrite blocks are placed underneath the transmitter coil to reduce the magnetic field leakage and improve the efficiency of the system. The ferrite blocks are modeled based on N87 material from EPCOS™. The compensation network is a double-sided LCC resonant network tuned at 85 kHz. The wireless charging coils and FOD systems are modeled in ANSYS Maxwell™ to measure the induced voltages and calculate the differential voltages. The metal object in this simulation is a 30×30×2 mm³ aluminum block that is at a Z-distance of 7 mm from the FOD sensor board. In this case study, the width of the FOD sensor coils is 24.2 mm.

In the normal operation of the wireless charging system, it is assumed that there is no misalignment between the charging pads. In this simulation, the metal object is moved from the outside of the transmitter coil ($X_{mo}$=−350 mm) to the middle point of the transmitter ($X_{mo}$=0 mm) and different Y positions (90 mm, 140 mm, and 240 mm) are considered for the metal object. The coordinate system for the position of the metal object is defined in FIG. 6. In order to evaluate the performance of the FOD system, a 150 mm Y-directional misalignment is applied.

The case study presents several considerations based on the exemplary FOD system, according to an embodiment, which was used:

The point $X_{mo}$=−350 mm is where the metal object is outside of the transmitter coil.

The point $X_{mo}$=0 mm is where the metal object is at the center of the transmitter coil.

The higher the sensitivity to the metal object, the performance of the sensor may improve.

Higher sensitivity to metal objects means that there is more difference between the condition that there is no metal object ($X_{mo}$=−350) and the case the metal object is on the transmitter coil (for example $X_{mo}$=−150).

The higher the sensitivity to misalignment the performance of the sensor may become worse.

Higher sensitivity to misalignment means that there is more gap between the curves of the voltage differential at different misalignment conditions.

Figure 7A:
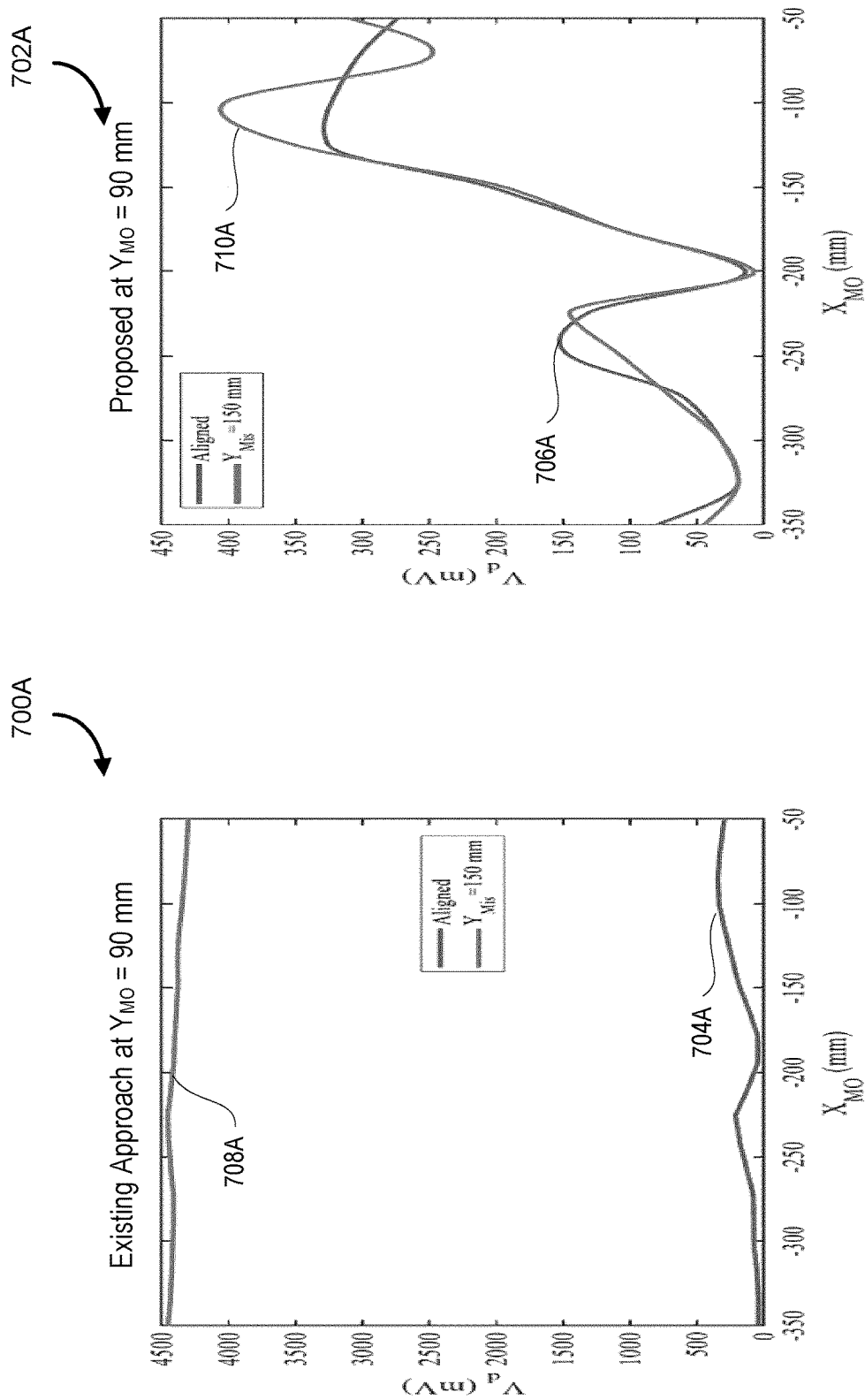
FIGS. 7A-C are graphs showing the operation of foreign object detection systems at normal aligned conditions versus under 150 mm Y-direction misalignment, according to some embodiments.
Figure 7B:
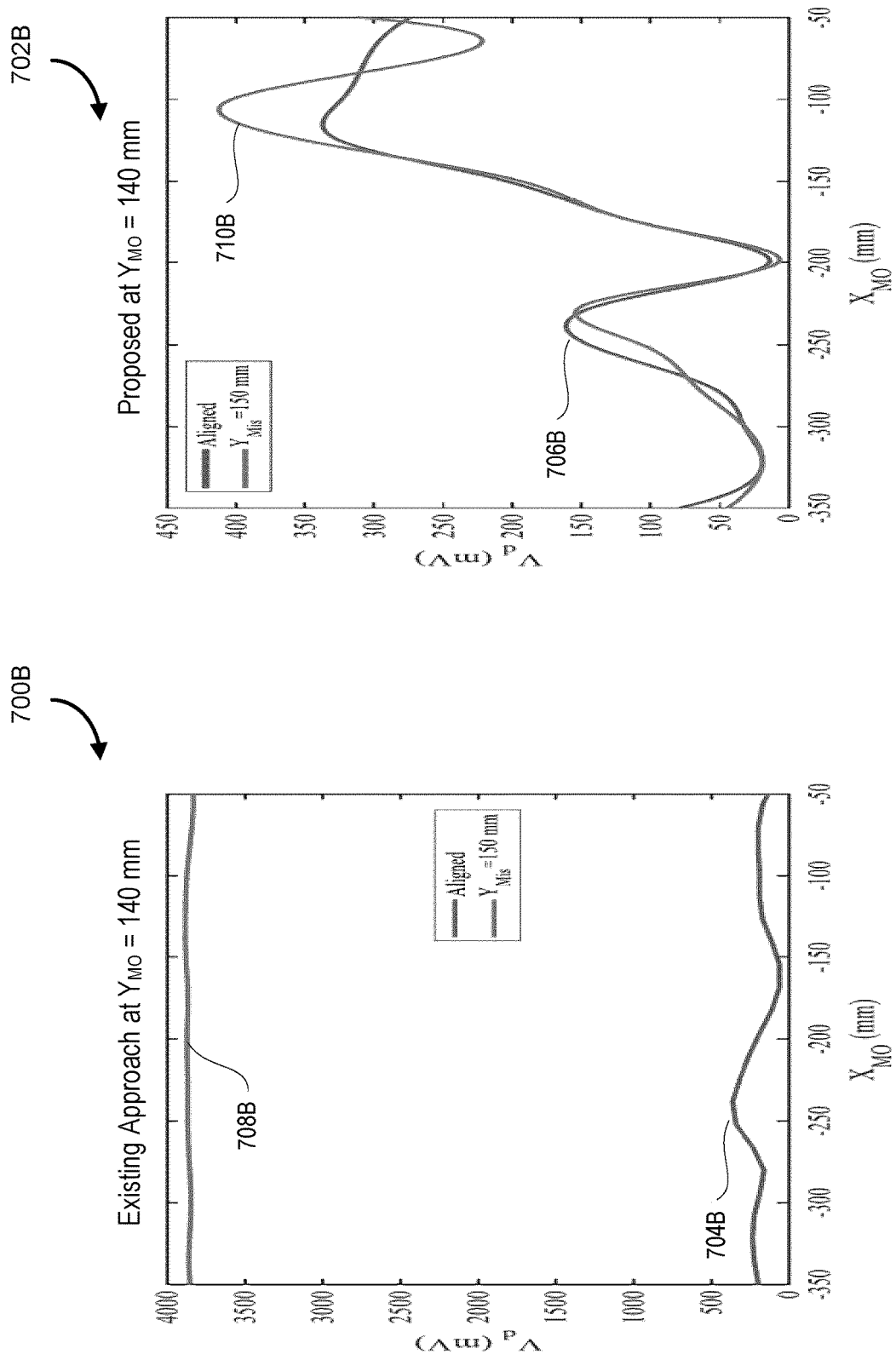
Figure 7C:
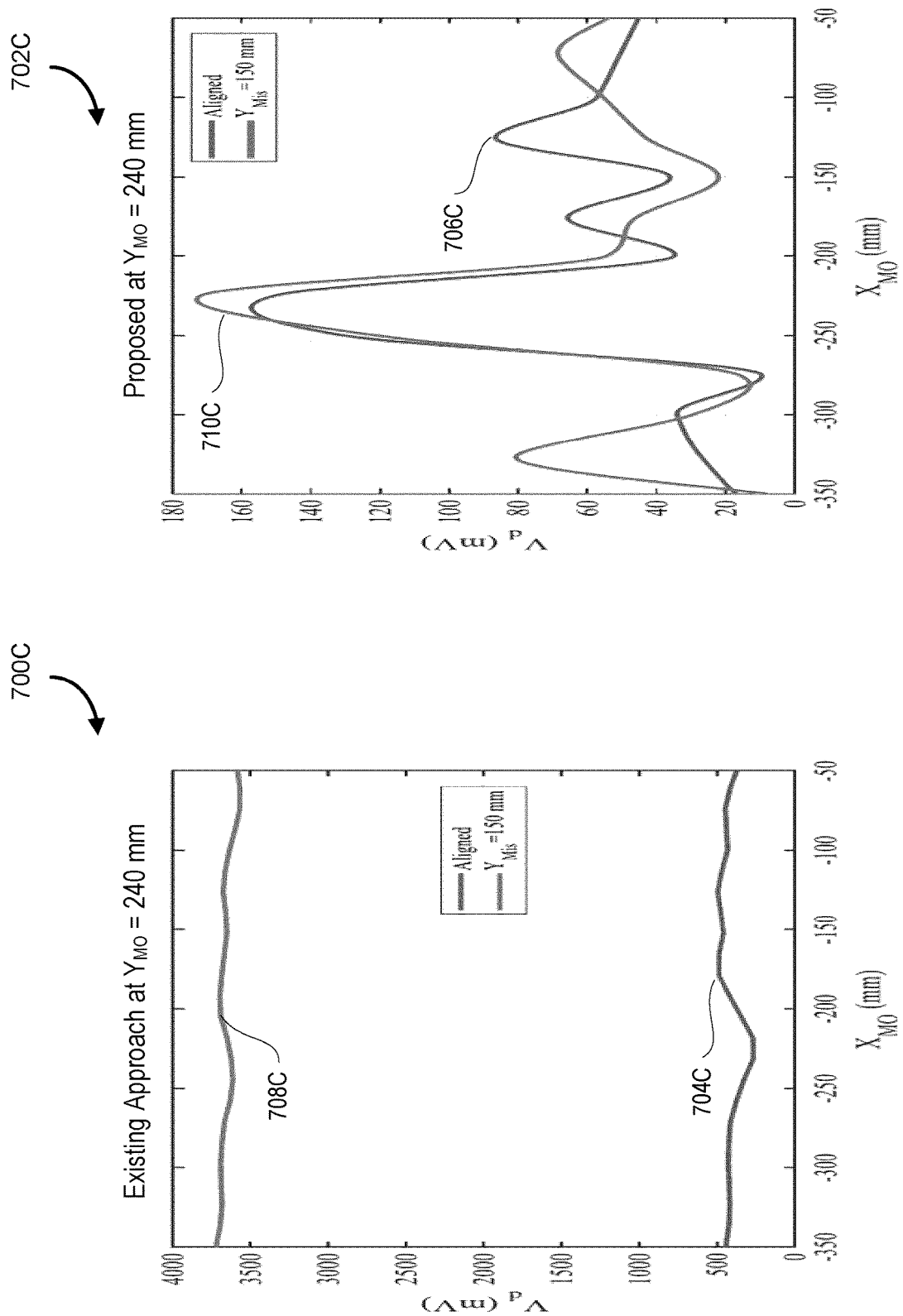

FIGS. 7A, 7B, 7C are graphs showing the operation of foreign object detection systems at normal aligned conditions versus under 150 mm Y-direction misalignment, according to some embodiments.

The left side graphs 700A, 700B, and 700C show the performance of an alternate system at different positions of the metal object under different misalignment conditions.

Curves 704A, 706A, 704B, 706B, 704C, 706C and curves 708A, 710A, 708B, 710B, 708C, 710C illustrate the differential voltage of the FOD system under aligned and misaligned operation conditions respectively.

It can be observed in 700A, 700B, and 700C that the misalignment of the wireless charging system caused the differential voltage to be significantly higher than the aligned operation mode (curves 704A-C). Moreover, the changes in the differential voltage versus the position of the metal object, $X_{MO}$ become negligible under misalignment. In this system, the differential voltage under misalignment is almost 7-10 times larger than the aligned operation condition. Therefore, misalignment reduces the sensitivity of the FOD system to the presence of a metal object or disables the FOD system completely.

In contrast, the differential voltage when the system is operating under the misalignment (curves 710A-C) is very close to the aligned operation (curves 706A-C) for the proposed system according to some embodiments, as shown on the right side graphs 702A, 702B, and 702C. Therefore, the proposed system may, in some embodiments, detect the presence of the metal object independent of the misalignment condition. Similar results can be presented for the second layout (Embodiment Variant II, e.g., shown in FIG. 5).

In other words, the alternate system lost its sensitivity to the metal object when operating under misalignment. However, the proposed FOD system, in some embodiments, showed similar performance in both the aligned and misalignment operating conditions. Therefore, the sensitivity of the FOD system to the metal object remained unchanged and independent of the misalignment of the main wireless charging coils.

Figures 8A, 8B:
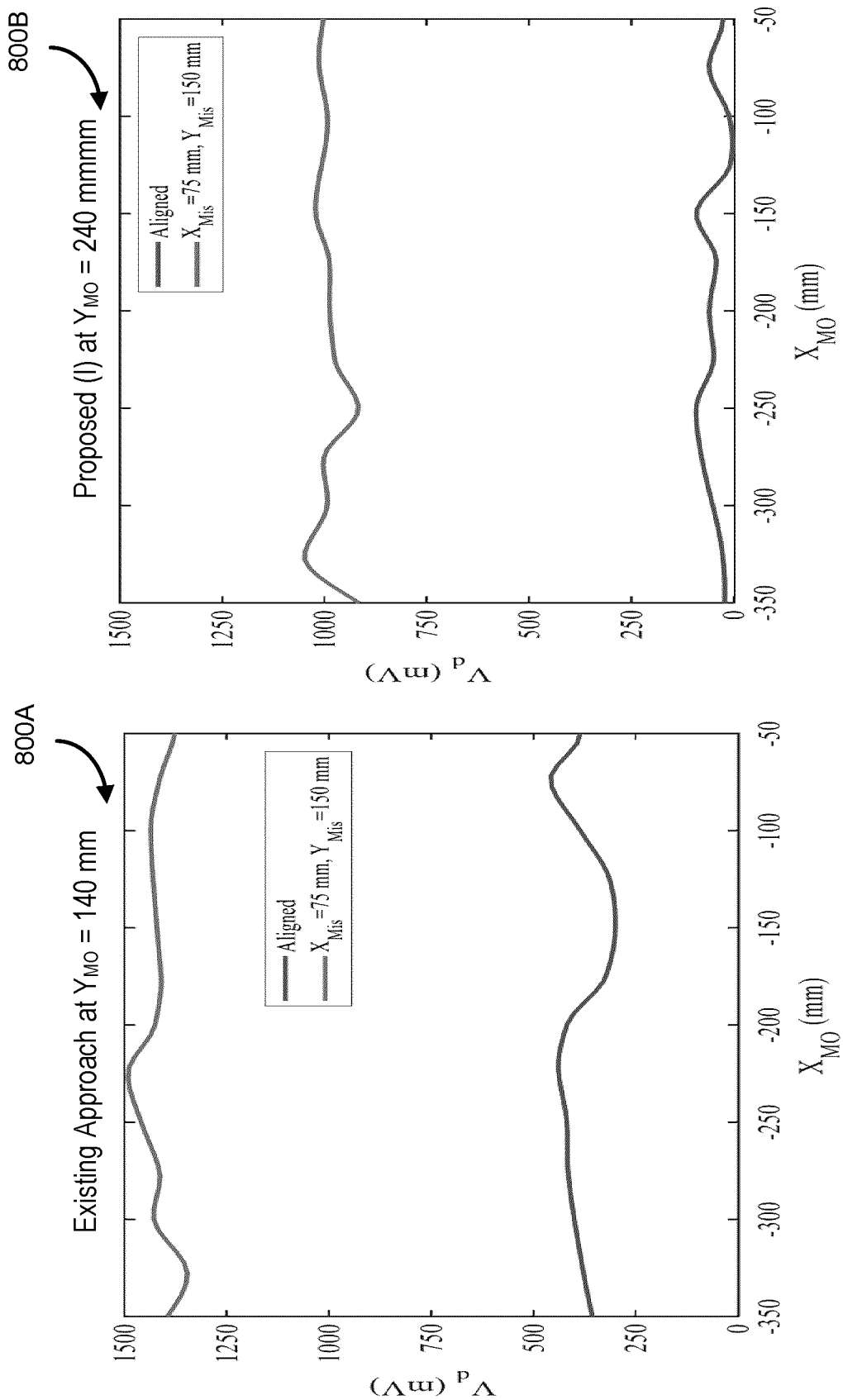
FIGS. 8A-C are graphs showing the operation of foreign object detection systems at normal aligned conditions versus under a 75 mm X-direction misalignment and a 150 mm Y-direction misalignment, according to some embodiments.
Figure 8C:
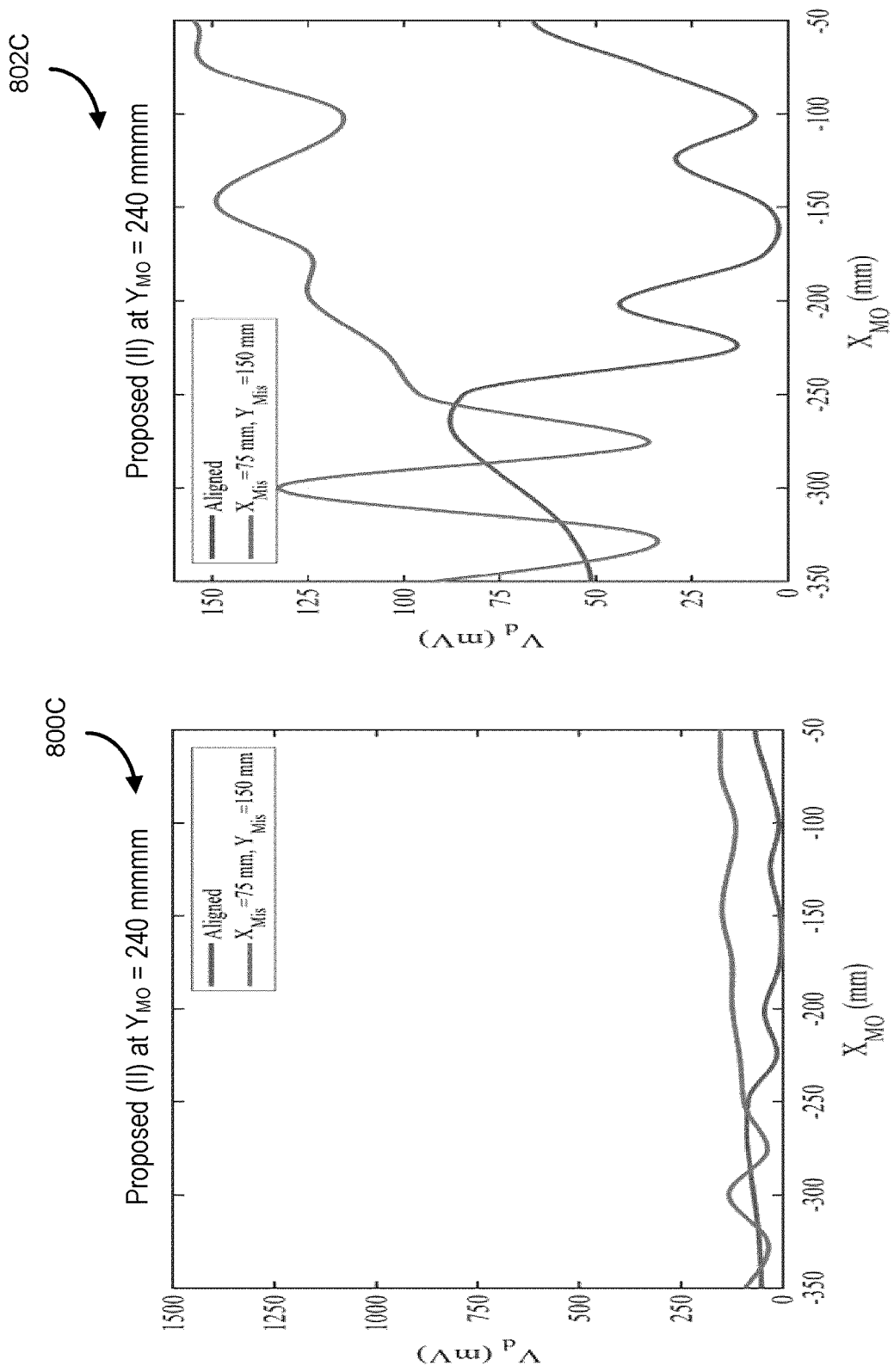

FIGS. 8A, 8B, 8C are graphs showing the operation of foreign object detection systems at normal aligned conditions versus under a 75 mm X-direction misalignment and a 150 mm Y-direction misalignment, according to some embodiments. As an example of the generalized misalignment tolerant FOD sensor (variant II, e.g., as shown in FIG. 5), the width of the sensor coils may be changed to half of the original design. The results for the alternate existing system, proposed variant I (e.g., as shown in FIG. 4) and the generalized form (variant II, e.g., as shown in FIG. 5) are shown in FIGS. 8A-C.

It can be seen in graph 800A that by applying x and y misalignment at the same time, the alternate system shows a significant difference in the differential voltage (very low sensitivity to metal objects and high sensitivity to misalignment) and fails to detect the metal object. The proposed variant I, such as that shown in FIG. 4, showed a better result by reducing the gap between the aligned case and misalignment case, and this may be seen in graph 800B. However, still there exist a significant difference between the aligned and misalignment operation. Graph 800C on the left, shows the result for the generalized misalignment tolerant FOD; in graph 802C on the right, a zoomed-in version is also presented. It can be seen that the difference between the aligned and misaligned cases is reduced significantly. This means that the FOD system is robust against x and y misalignment (at the same time) while maintaining sensitivity to the metal objects. As shown, the system is useful for detection of one or more foreign objects during wireless charging adapted for continued operation despite a misalignment of a transmitter coil and a receiver coil.

A comparator circuit can be coupled to the first sensor coil set and the second sensor coil set to determine a differential voltage between voltages of the first sensor coil set $a_1$ and the second sensor coil set $b_1$, and variations are possible in respect of the comparator circuit. Changes in induced voltage in the first sensor coil set $a_1$ and the second sensor coil set $b_1$ due to the misalignment of the transmitter coil and the receiver coil are compensated due to the diagonal positioning of the first sensor coil set $a_1$ and the second sensor coil set $b_1$ relative to one another.

In some embodiments, coil $a_1$ may be mirrored about one or more axes of radial symmetry to produce coil $b_1$. Similarly, in some embodiments, for coils $a_2$ and $b_2$, and so on. Sensor coil sets may be referred to as a and b whereas the "sensor coils" may be $a_1$, $b_1$, $a_2$, $b_2$, $a_3$, $b_3$, etc. which can consist of multiple portions. The sensor coils may be compared in pairs to obtain multiple differences $a_1$-$b_1$, $a_2$-$b_2$, etc. between the two sets. The comparator circuit determines current or voltage differences.

An additional variant is proposed below, noted as Variant II, where at least one of the first sensor coil set $a_1$ and the second sensor coil set $b_1$ are subdivided into a plurality of portions which are positioned in a symmetrical layout where the misalignment of the transmitter coil and the receiver coil is compensated in a plurality of directional misalignments simultaneously.

Figure 9:
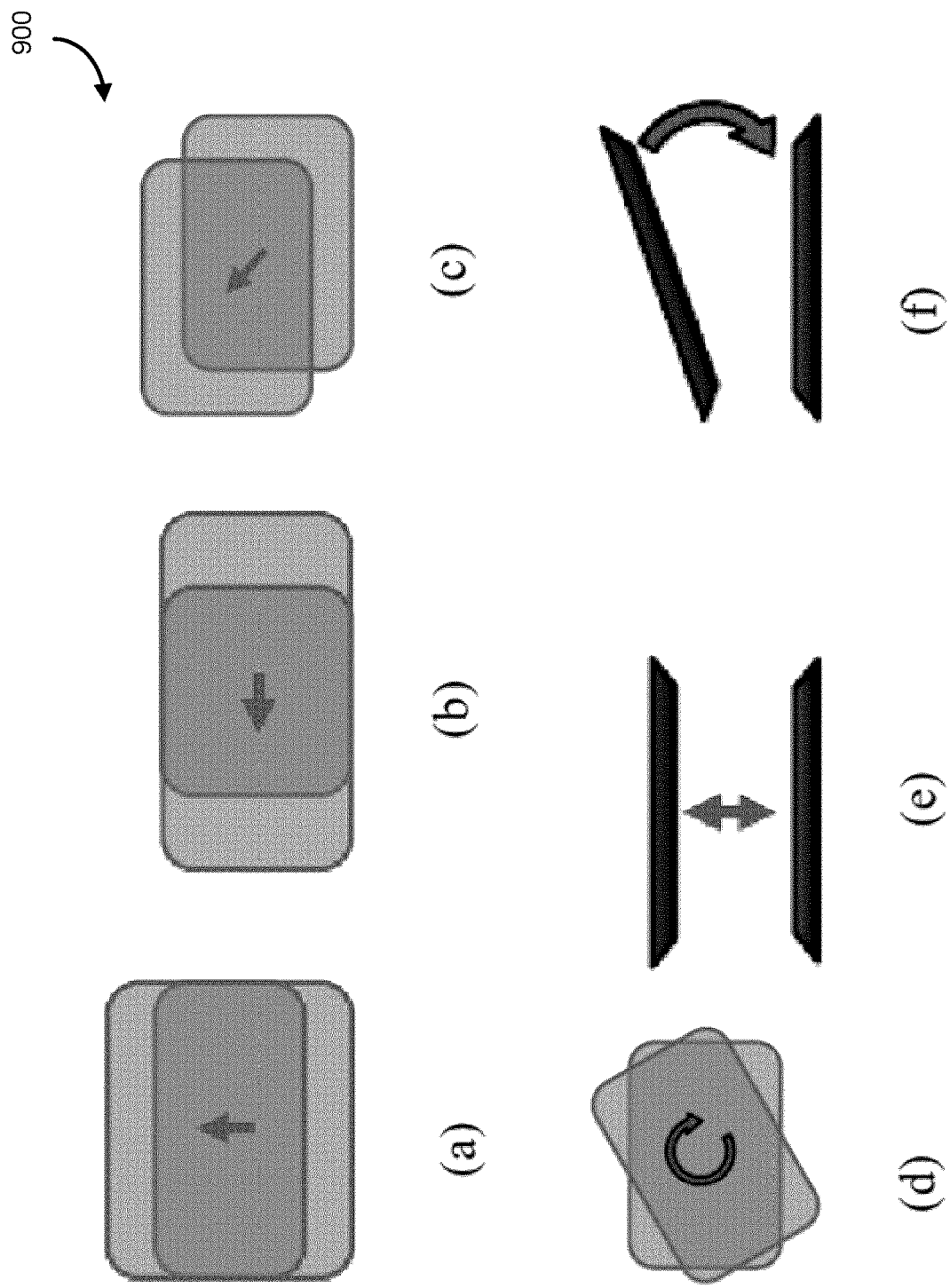
FIG. 9 is an illustrative diagram showing misalignment positions and differential misalignments as (a)-(f), according to some embodiments.

FIG. 9 is an illustrative reference diagram 900 showing misalignment positions and differential misalignments. System 500, for example, may also be robust against Z-direction misalignment, type (e) as specified in FIG. 9. However, by adding different axes of symmetry (new layouts based on variant II, for example, as seen in FIG. 5), a rotational misalignment can also be covered. The rotational misalignment is the case where there is a misalignment angle between one edge of the transmitter and receiver (instead of being in parallel).

Under misalignment directions specified in FIG. 9, Variant I, as seen in FIG. 4 for example, may be robust against either misalignment type (a) or (b), one at a time. Variant II, as seen in FIG. 5 for example, may be robust against (a) and (b) simultaneously which results in type (c) misalignment. By further dividing the coils into more parts, more axes of symmetry can be added in some embodiments that can cover type (d) to some degree.

FIG. 10 is a schematic 1000 showing an extended foreign object detection system with more axes of symmetry, according to some embodiments. The example layout that is shown, may be robust to about 22.5 degrees receiver coil rotation, for example, and be robust against misalignment type (d), as specified in FIG. 9.

In another embodiment, each of the first sensor coil set $a_1$ and the second sensor coil set $b_1$ are each subdivided into four parts and positioned mirrored (e.g., diagonally) relative to one another.

In another embodiment, a number of the plurality of portions of the first sensor coil set $a_1$ or the second sensor coil set $b_1$ is determined based on a target voltage sensitivity of the differential voltage.

The number of portions may be more important for robustness against misalignment (because the distribution of portions can create more axes of symmetry). The width may then be adjusted based on target object size (which correlates to voltage sensitivity).

In another embodiment, the comparator circuit is coupled to the first sensor coil set and the second sensor coil set across a potentiometer through a multiplexer circuit.

The potentiometer may, in some embodiments, be similar to the comparator circuit. Instead of a potentiometer, in some embodiments, a simple series connection of two constant resistors can be used. A potentiometer can actively zero the voltage difference but may not be necessary to use in some embodiments. A multiplexer circuit is also not necessary, as multiple ADCs can be used instead, for example. The use of a multiplexer may reduce the number of ADC channels required.

In an embodiment, the differential voltage is obtained at the mid-point of the potentiometer.

In another embodiment, a width of each sensor coil in the set of sensor coils is determined at least based on a target voltage sensitivity of the differential voltage.

In another embodiment, a width of each sensor coil in the set of sensor coils is determined at least based on the number of the plurality of portions of the first sensor coil set a1 or the second sensor coil set b1.

In an embodiment, the wireless charging is conducted between a power source and an electric vehicle or a portable electronic device.

In another embodiment, upon the differential voltage being greater than a threshold differential voltage, an alarm notification or control output is generated.

In some embodiments, the system may compare differential voltage between initial charge state and current charge state.

In some embodiments, the system may retrofit an existing wireless charging system, for example. In some embodiments, the system may be a system implemented alongside or coupled with a wireless charging system. In some embodiments, it may be a wireless charging system with alarms, notifications, and/or rectification mechanisms. For example, the system may in some embodiments, notify a driver of a foreign object that was detected, or perhaps if the car is parked in a position that is too far misaligned with the charging pad.

Some embodiments may include object ignoring, which may allow the system to ignore a detected foreign object if below a threshold, for example. The system may track the heat, but continue charging so long as the heat remains below a set threshold, in some embodiments. In some embodiments, the FOD system may be used in conjunction with living object detection systems (thermal/IR camera, movement detection, capacitive detection, etc.). In some embodiments, the system may include an alarm for detected objects or when charging is shutdown should the threshold be passed.

In some embodiments, there may be downstream activation of a heating detection mechanism, for example.

According to some embodiments, the system may operate in an exemplary order, such as, the system may start charging, a foreign object may be detected, and the FOD system may indicate the problem (e.g., may send an alert to the car owner), and/or the system may shutdown and stop charging.

It should be noted that the described systems and methods for foreign object detection and charging that is robust to misalignment are not limited to EV charging applications. In some embodiments, the systems may be used for phone charging/chargers, external battery charging/chargers, car charging/chargers (e.g., hybrid vehicles), drone charging/chargers, cargo and cruise ship charging/chargers, charging/chargers for autonomous underwater vehicles and automatic guided vehicles, and autonomous wheelchair charging/chargers, among other applications.

Figure 11:
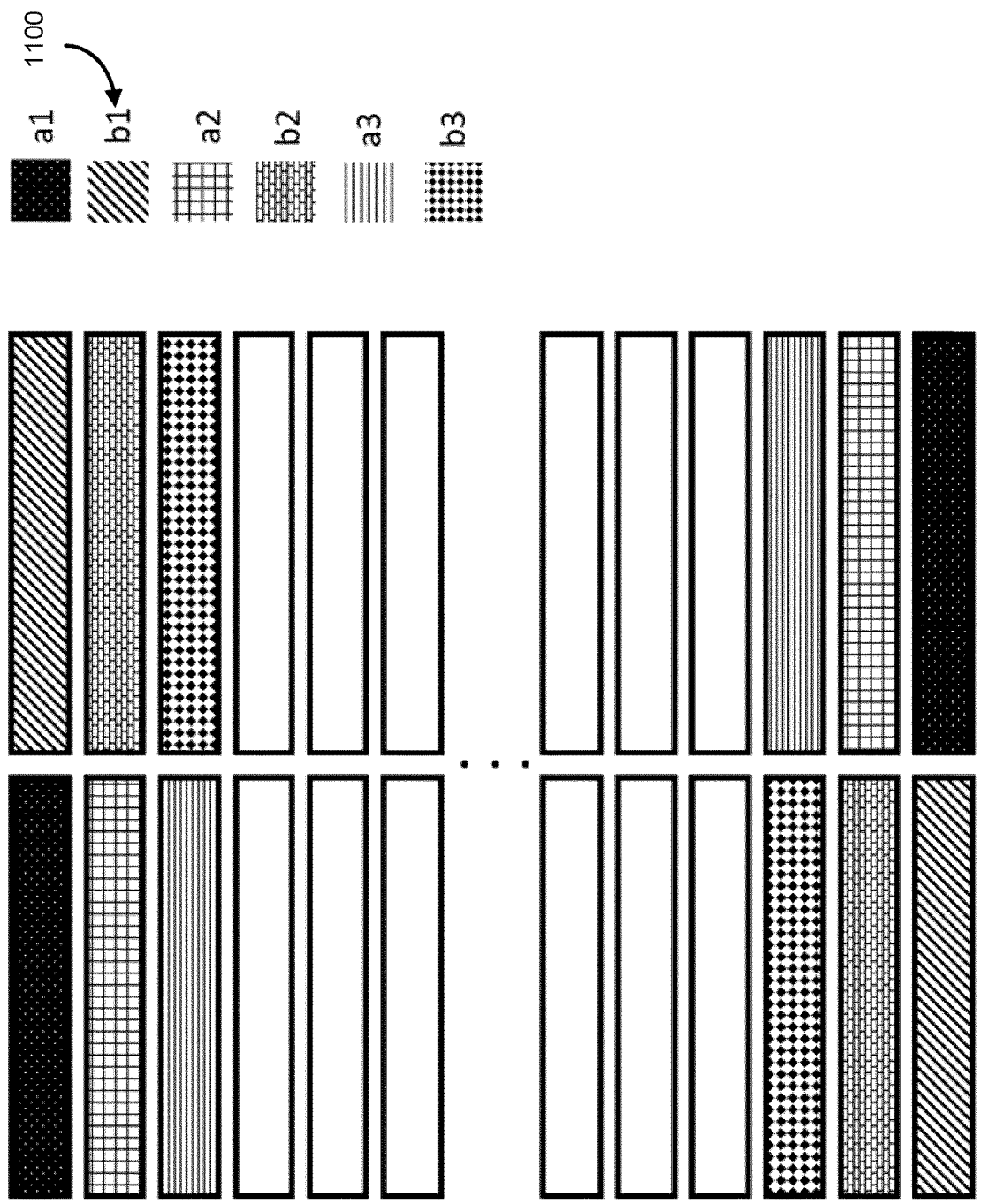
FIG. 11 is an illustrative diagram showing a misalignment tolerant symmetrical foreign object detection system, according to some embodiments.

FIG. 11 is an illustrative diagram 1100 showing a misalignment tolerant symmetrical foreign object detection system, according to some embodiments. In some embodiments, FIG. 11 may show a system which is similar to the system shown in FIG. 4.

Figure 12:
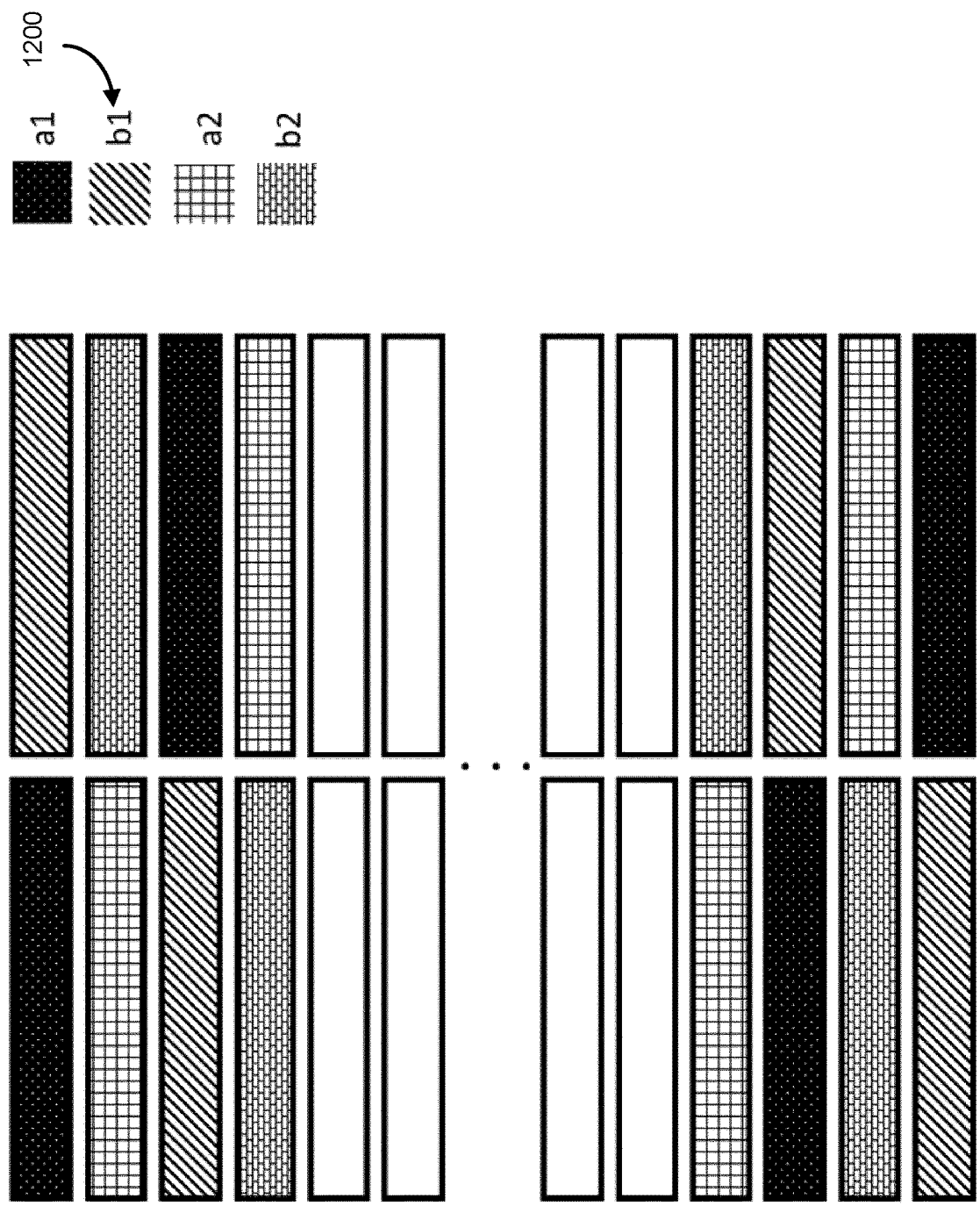
FIG. 12 is an illustrative diagram showing another example misalignment tolerant symmetrical foreign object detection system, according to some embodiments.

FIG. 12 is an illustrative diagram 1200 showing a misalignment tolerant symmetrical foreign object detection system, according to some embodiments. In some embodiments, FIG. 12 may show a system which is similar to the system shown in FIG. 5.

Figure 13:
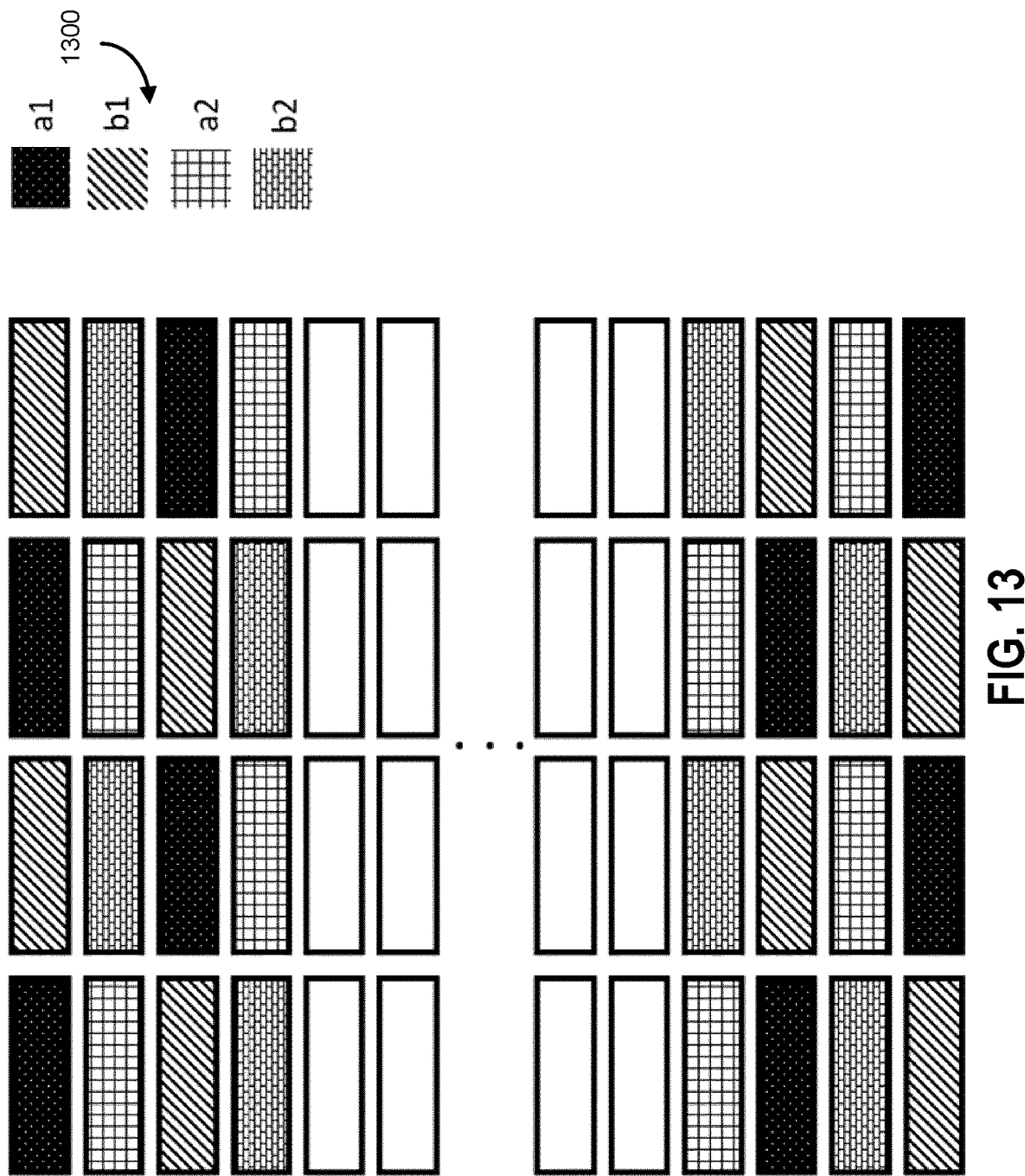
FIG. 13 is an illustrative diagram showing an extended foreign object detection system with more axes of symmetry, according to some embodiments.

FIG. 13 is an illustrative diagram 1300 showing an extended foreign object detection system with more axes of symmetry, according to some embodiments. By adding different axes of symmetry in some embodiments, a rotational misalignment may also be covered. The rotational misalignment is the case where there is a misalignment angle between one edge of the transmitter and receiver, rather than being in parallel.

Figure 14:
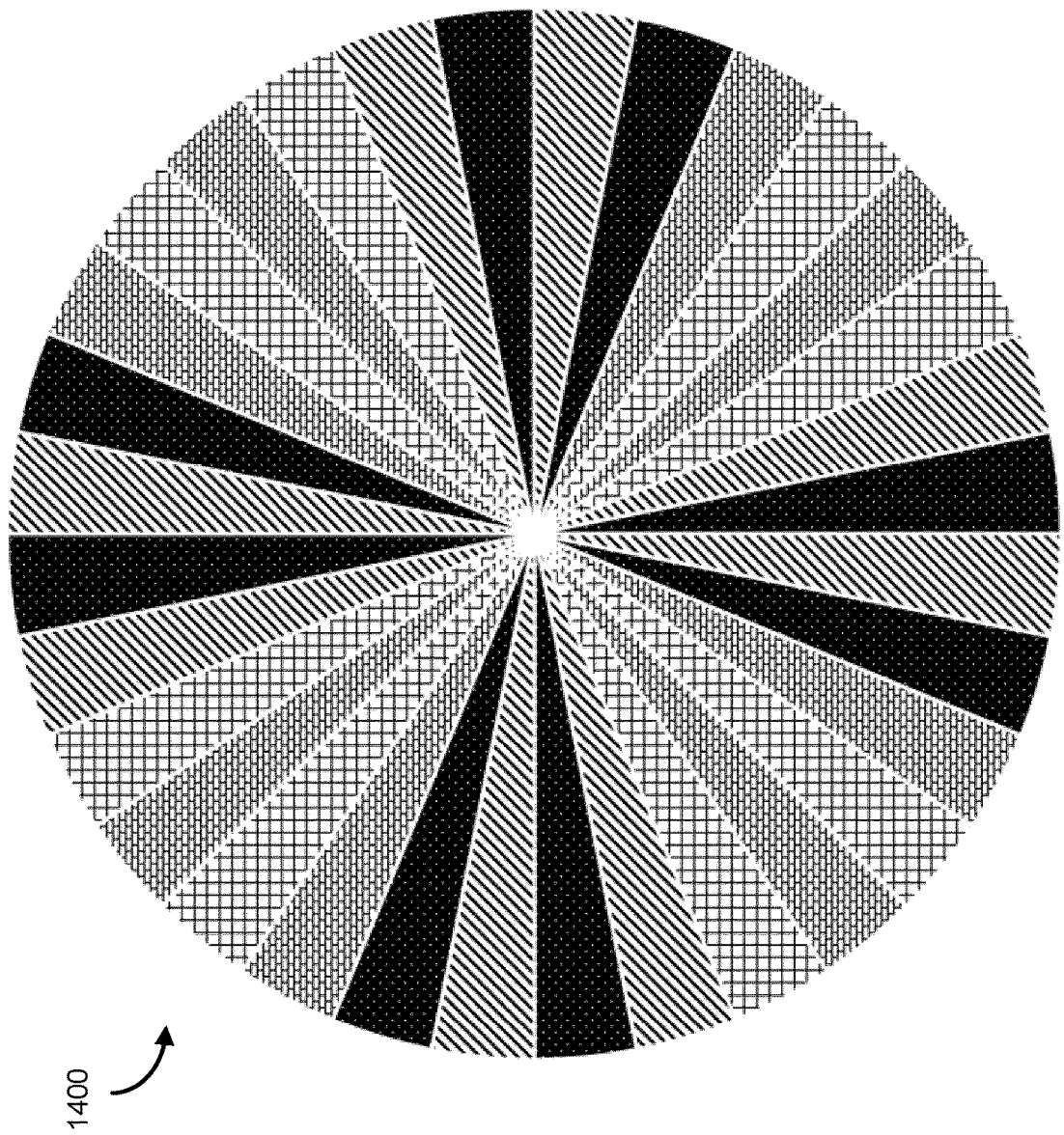
FIG. 14 is an illustrative diagram showing a circular sensor coil structure, according to some embodiments.

FIG. 14 is an illustrative diagram 1400 showing a circular sensor coil structure, according to some embodiments. In such a structure, there may be high misalignment tolerance along 4 axes of symmetry, although there may be blind spots in the shown structure.

FIG. 15 is an illustrative diagram 1500 showing a circular sensor coil structure, according to some embodiments. In such a structure, there may be medium misalignment tolerance along 4 axes of symmetry, however there may be almost no blind spots in the shown structure.

Figure 16:
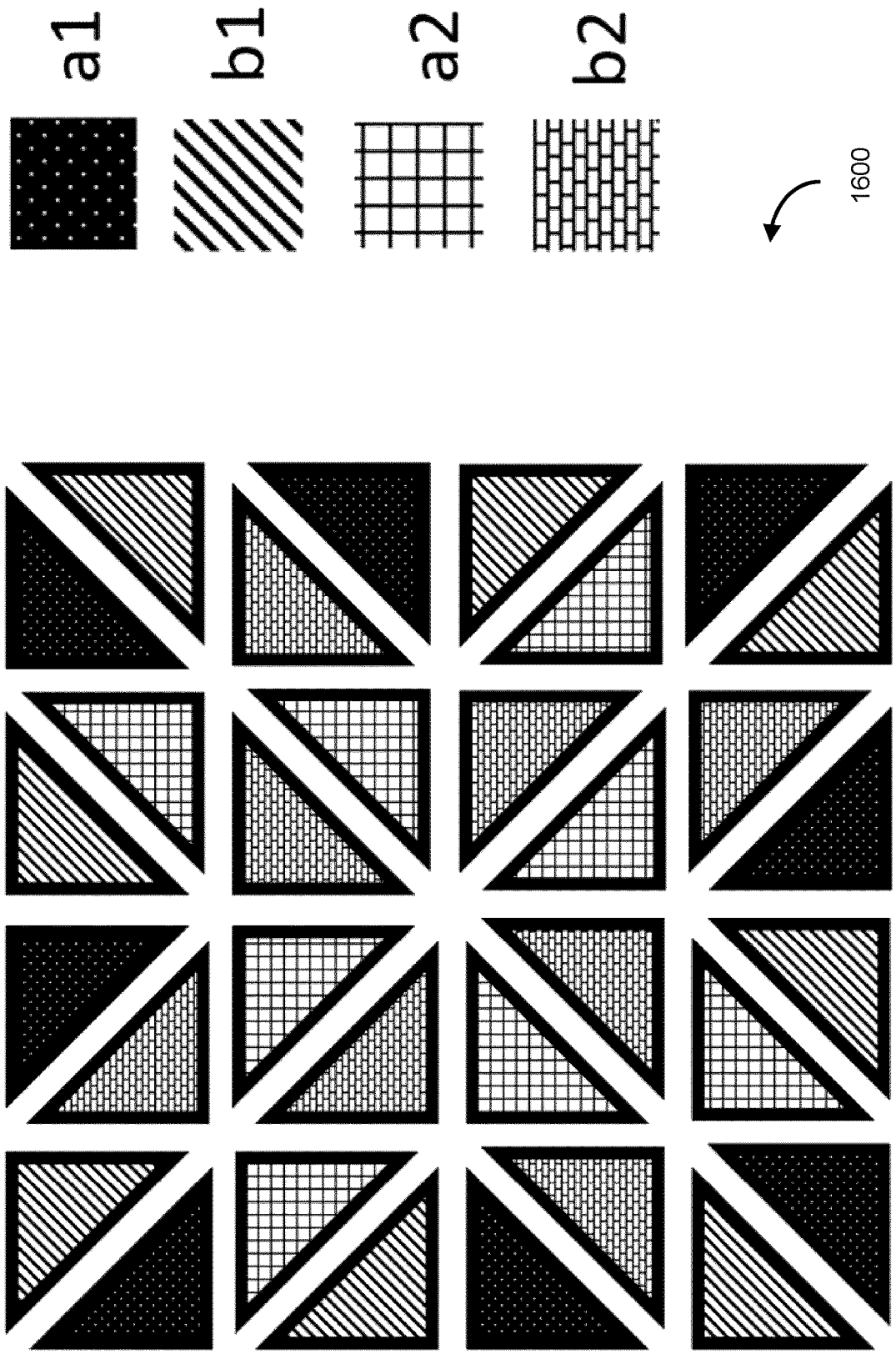
FIG. 16 is an illustrative diagram showing a square sensor coil structure example, according to some embodiments.

FIG. 16 is an illustrative diagram showing a square sensor coil structure example, according to some embodiments. In such a structure, there may be medium misalignment tolerance, 4 axes of symmetry, and there may be few blind spots.

Figure 17:
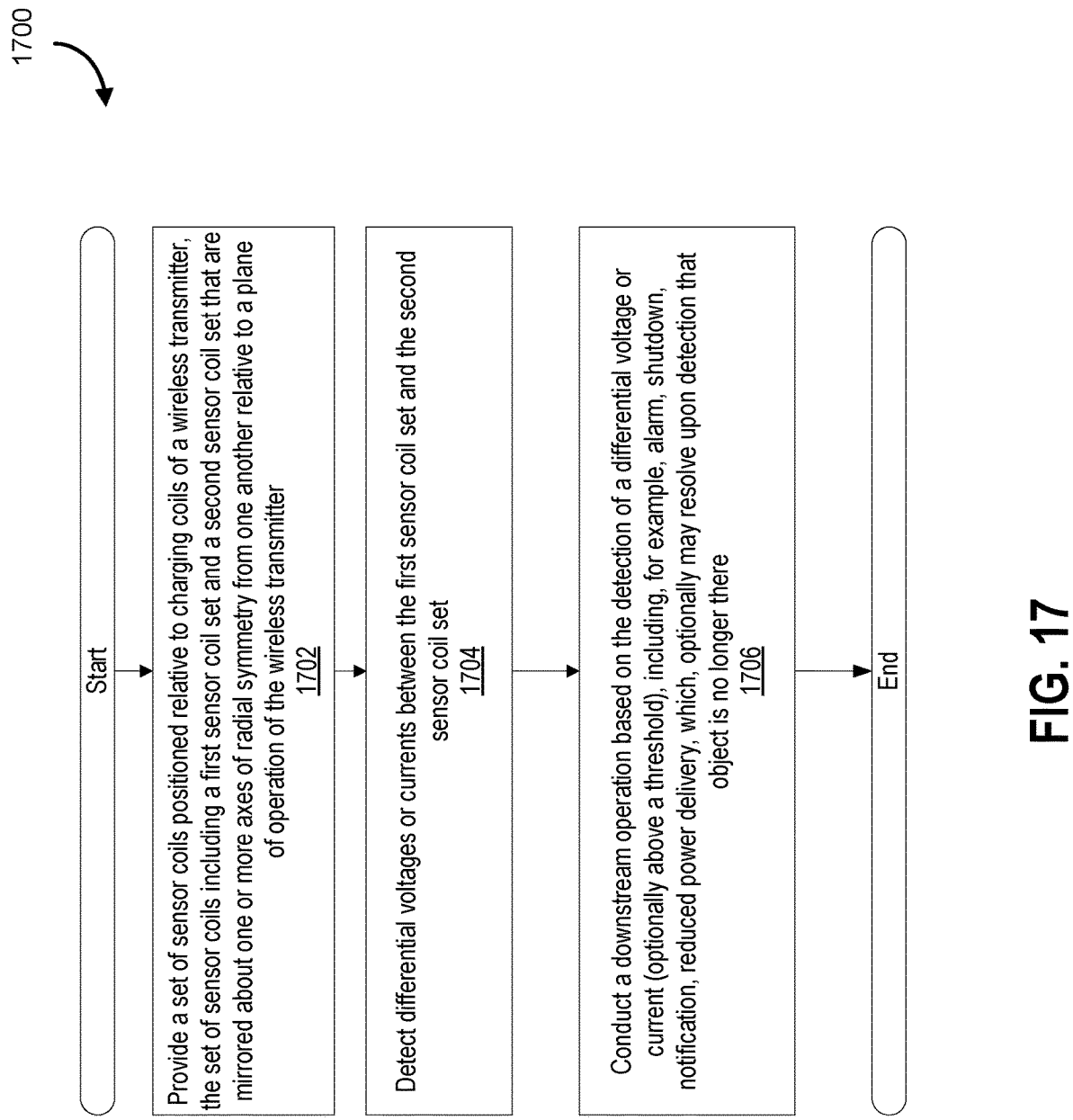
FIG. 17 is a method diagram showing an example process for operation of an exemplar system, according to some embodiments.

FIG. 17 is a method diagram 1700 showing an example process for operation of an exemplar system, according to some embodiments. Steps of a method are shown at 1702,

1704, 1706, where the differential voltages or currents can be detected and used to modify an operational status or state of the system.

Figure 18:
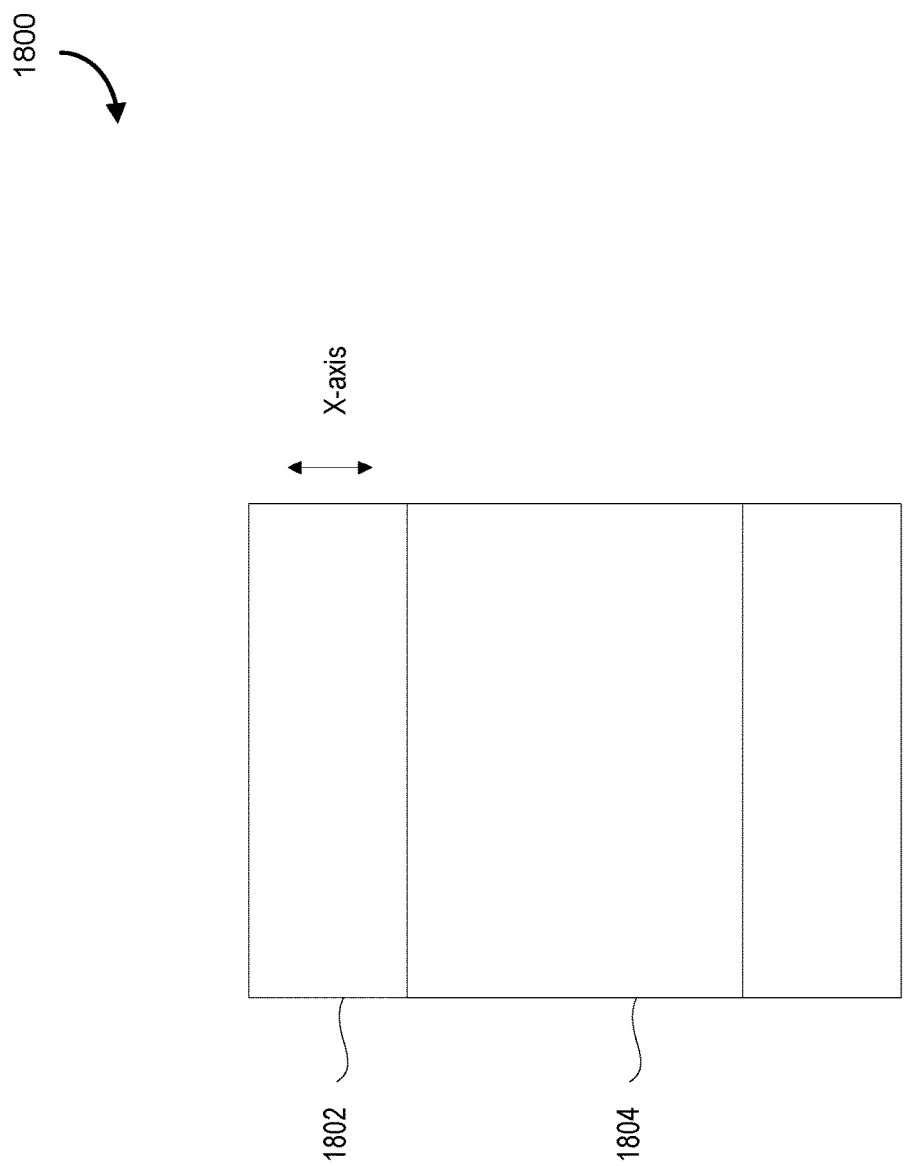
FIG. 18 is an illustrative diagram showing a potential misalignment in a first direction (e.g., x direction), according to some embodiments.

FIG. 18 is an illustrative diagram 1800 showing a potential misalignment in a first direction (e.g., x direction), according to some embodiments. The wireless transmitter portions 1802 and receiver 1804 are shown, and they are misaligned in one direction. This can occur, for example, when a vehicle is not parked properly over the wireless charging region (e.g., vehicle not pulled up far enough). It is important that the foreign object detection system operates properly despite this type of misalignment.

Figure 19:
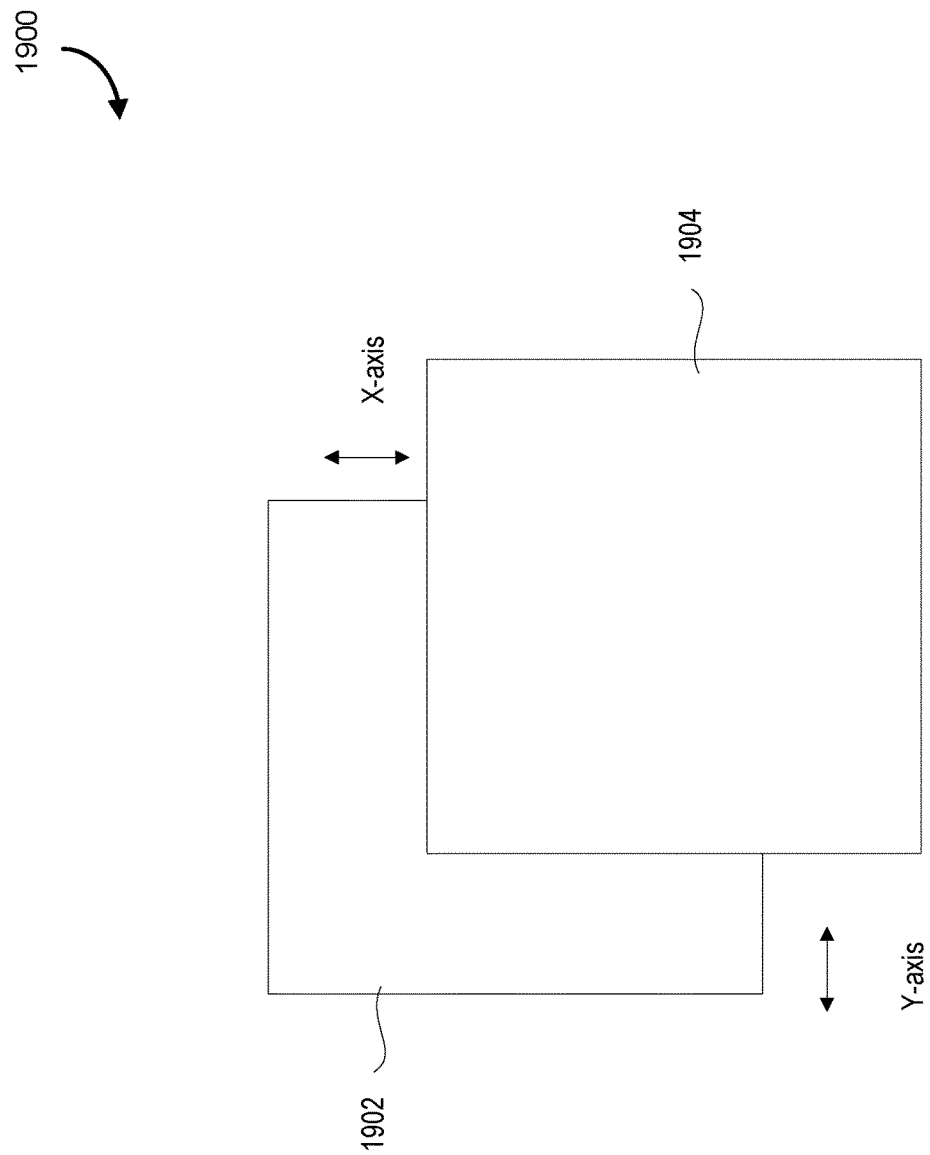
FIG. 19 is an illustrative diagram showing a potential misalignment in multiple directions simultaneously (e.g., x-y direction misalignment), according to some embodiments.

FIG. 19 is an illustrative diagram 1900 showing a potential misalignment in multiple directions simultaneously (e.g., x-y direction misalignment), according to some embodiments. The wireless transmitter portions 1902 and receiver 1904 are shown, and they are misaligned in two directions.

This can occur, for example, when a vehicle is not parked properly over the wireless charging region, and in comparison with FIG. 18, the vehicle is in the spot in a crooked orientation (e.g., an extra-wide parking spot at a wholesale retailer). It is important that the foreign object detection system operates properly despite this more complex type of misalignment, and this is addressed in some variants proposed above.

Figure 20:
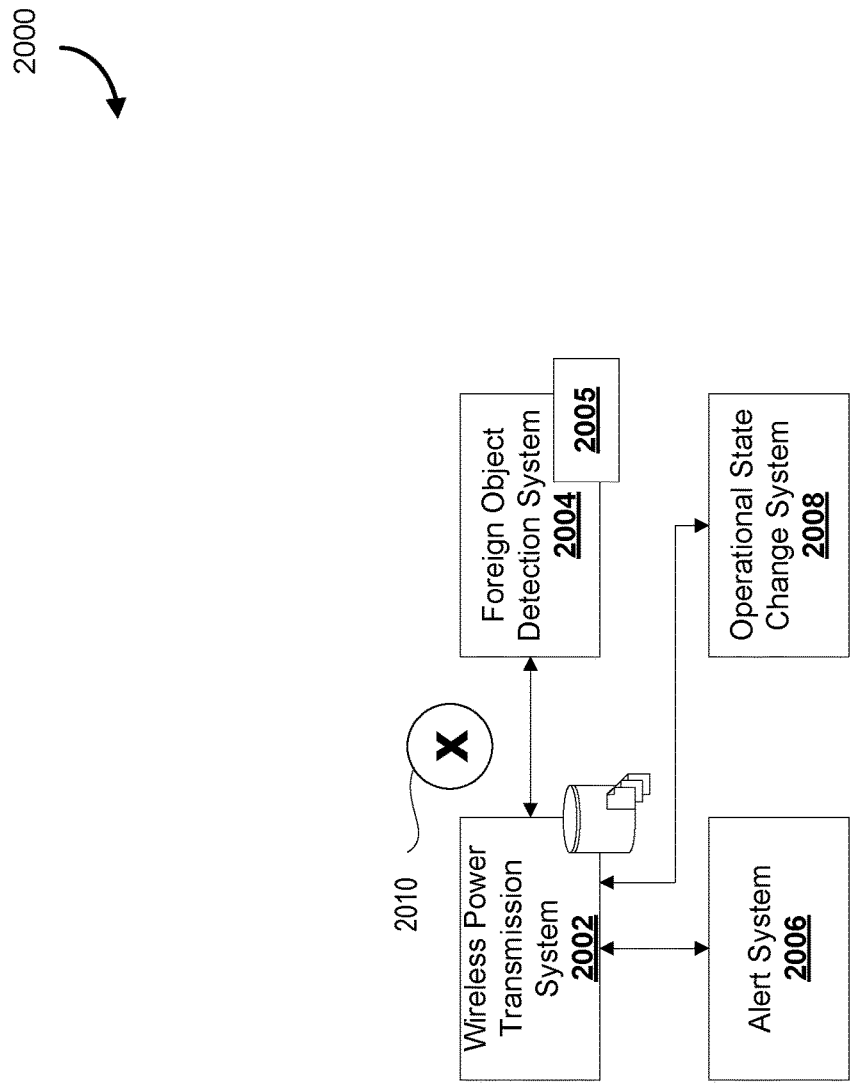
FIG. 20 is a pictographic showing the foreign object detection system operation in conjunction with a wireless power transmission system and an alert/operational condition rectification system, according to some embodiments.

FIG. 20 is a block schematic pictographic 2000 showing the foreign object detection system 2004 operating in conjunction with a wireless power transmission system 2002 and an alert/operational condition rectification system 2006/2008, according to some embodiments. The circuit for tracking the differential voltages or currents (e.g., a comparator) is shown at 2005. A foreign object 2010 is shown in an example illustration. As noted herein, the foreign object can include various objects that have an effect on the operation of the power transfer from the transmitter to the receiver. These objects can include, but are not limited to, metallic objects (e.g., coins, plates, debris) or other types of materials which absorb or otherwise impact the power flow (e.g., reflect). In a widespread commercial implementation of wireless charging systems, it is possible that, for example, parts of a vehicle fall off onto into the charging path (e.g., heat shield), debris falls into the area (e.g., nails, screws), objects fall out of pockets (e.g., coins).

In operation, the foreign object detection system approach can be utilized to perform a method for detecting of one or more foreign objects. The method is conducted before wireless charging starts (e.g., when the wireless charger is activated but before charging begins). This can be done immediately before charging as a pre-requisite to charging, or it can be done periodically during charging operation. The reason for this is to check for foreign objects that could be present (and potentially impart an efficiency or a safety concern). Efficiency and safety can be coupled together, for example, as a foreign object in the charging path could inadvertently receive energy, become heated, and thermally damage (e.g., melt) the wireless charger, the device being charged, or a housing of the wireless charger. As a practical example, this can include a wireless charging enabled parking spot where a metal plate has fallen from a grating. If the wireless charging commences, the plate could heat up, and ultimately melt the wireless charging pad or damage the surrounding asphalt. It is challenging to detect foreign objects when the transmitter coil and the receiver coil are misaligned (which can occur in the context of a parking spot wireless charging due to offset alignment of vehicle and parking spot).

In particular, the method includes first applying an auxiliary high frequency voltage on the sensor coils. The auxiliary high frequency voltage can be defined, for example, in the range of a few MHz. The frequency range of 3 MHz is selected because of its higher sensitivity and ease of implementation. Other frequency ranges, such as 1-6.8 MHz, are possible.

The method then includes sensing one or more voltages or currents using a set of sensor coils positioned relative to the charging coils of a wireless transmitter, the set of sensor coils includes a first sensor coil set and a second sensor coil set that are mirrored about one or more axes of radial symmetry from one another relative to a plane of operation of the wireless transmitter. The sensor coils are positioned on top of the charging coils of a wireless transmitter, and this is provided in an example shown in FIG. 4. Each of the sensor coil sets, for example, can include 12 pairs, as shown in the example in FIG. 4.

Typically, the voltages or currents are being sensed continuously to detect the presence of a foreign object, such as an aluminum can, in a practical scenario.

The sensor coils are then operated to determine differential voltages or currents based on at least one or more voltages or currents. A differential voltage or current is identified between the first sensor coil set and the second sensor coil set. An example in a practical scenario could be 0.2 V in one sensor coil set and 0.3 V in the other sensor coil set. The difference between the two sets is 0.1 V which indicates the presence of a metal object. Because the coil sets are mirrored about the axes of radial symmetry, the differential voltage or current is useful despite misalignment because the voltages would be equal if there is no metal object on the sensor coils. In case of misalignment, since both sets face similar magnetic fields due to the symmetry of the sensor design, no offset will be added to the measured voltages of the coil sets.

However, the same method of operation would not be applicable to existing alternate designs such as the example shown in FIG. 1. Measured voltage from one of the coil sets will be shifted up due to misalignment and in turn disrupts the detection algorithm. In this example, one coil can be at 1.2 V, and the other coil set 0.3 V. It can be seen that the differential voltage, in this case, cannot be used to detect the presence of metal object because the conventional sensor design cannot distinguish between the effects of misalignment and metal object in the observed differential voltage.

In particular, changes in coil or auxiliary load voltage or current in the first sensor coil set and the second sensor coil set due to the misalignment of the transmitter coil and the receiver coil are compensated by the symmetrical placement of the first sensor coil set and the second sensor coil set relative to one another and to the transmitter and receiver misalignment axis in this context. This approach is able to handle a misalignment of 200 mm range for EV charging applications and provides a technical improvement over other approaches because of an enhanced ability to operate despite misalignment. As noted above, other approaches were inadequate because of the misalignment effect on the sensor coil voltages and malfunction in their ability to detect metal objects, and this could lead to major safety issues or require expensive workarounds. The proposed approach, while requiring additional upfront investment, provides an elegant approach to addressing safety/efficiency issues and providing a practical application for an improved FOD design where the geospatial orientation and an improved operation method are proposed to operate in tandem. The approach is grounded in physical, practical embodiments, such as a wireless charger that is embedded or coupled into a parking spot.

Upon determining the differential voltages or currents (e.g., greater than a threshold of 5% or any other value that can be set by the designer), the system can issue an alarm notification to request that the wireless charger be inspected for a foreign object, or trigger a control element, such as an actuator arm coupled to a motor, etc., to attempt to sweep the foreign object away. In some embodiments, the wireless charging is not permitted to commence until the system re-checks and issues an "all clear" signal. In another variation, the wireless charging is permitted to commence, but at a reduced power level, such as 1%-10% of the nominal power, and the wireless charger can be configured to periodically check for foreign objects and return to full power when an "all clear" signal is issued. A typical check for foreign objects takes in the order of 100 milliseconds. In a further variation, the system is coupled with additional safety sensors, and the foreign object detection system is an input into a controller circuit that uses a combination of inputs in controlling operation of the wireless charger.

In some embodiments, the system can also interoperate with camera systems or other systems to validate the presence of the object or to send an alert with an image so that a caretaking individual may be able to clear the object. As described herein in some variants, the size or impact of the object can also be assessed to modify the operation of the system based on the characteristics (e.g., very small→do nothing, small→reduce power, medium/large→shutdown until clearance confirmed).

While not limited to electric vehicles specifically, this approach could help with increased adoption of green technologies by reducing a friction point associated with charging and range anxiety, as a driver could conveniently charge a vehicle while, for example, running errands, without having to take steps to physically connect a wired charger, etc. However, for wireless charging at high power, it is important to design systems that are resilient to practical non-idealities, such as misalignments that are caused by inaccurate coupling as between transmitter and receiver.

Presented herein, are new symmetrical sensor coil layouts for an FOD system, according to some embodiments, for EV wireless charging applications, for example. The proposed layout, in some embodiments, may be symmetrical in both X and Y misalignment directions. Therefore, the changes in the magnetic field distribution may not affect the sensitivity of the FOD system. It was shown that the proposed system is more robust against the changes of the misalignment compared to an existing alternate system through simulations. Moreover, an exemplary 6.6 kW wireless charging system with a rectangular main coil was built to evaluate the performance of the proposed FOD system. It was shown that the FOD system, in some embodiments, is capable of detecting metal objects within the range of the misalignment of 0 to 150 mm in both X and Y directions.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

REFERENCES

[1] V. X. Thai, G. C. Jang, S. Y. Jeong, J. H. Park, Y. S. Kim, and C. T. Rim, "Symmetric Sensing Coil Design for the Blind-Zone Free Metal Object Detection of a Stationary Wireless Electric Vehicles Charger," *IEEE Trans. Power Electron.*, vol. 35, no. 4, pp. 3466-3477, 2020, doi: 10.1109/TPEL.2019.2936249.

[2] S. Li and C. C. Mi, "Wireless power transfer for electric vehicle applications," *IEEE Trans. Emerg. Sel. Topics Power Electron.*, vol. 3, no. 1, pp. 4-17, 2015.

[3] Z. Bi, T. Kan, C. C. Mi, Y. Zhang, Z. Zhao, and G. A. Keoleian, "A review of wireless power transfer for electric vehicles: Prospects to enhance sustainable mobility," *Applied Energy*, vol. 179, pp. 413-425, 2016.

[4] "Wireless Power Transfer for Light-Duty Plug-In/Electric Vehicles and Alignment Methodology, Standard SAEJ2954, 2020." https://www.sae.org/standards/content/j2954_202010/(accessed.

[5] A. Ramezani and M. Narimani, "Optimized Electric Vehicle Wireless Chargers With Reduced Output Voltage Sensitivity to Misalignment," *IEEE J. Sel. Topics Power Electron.*, vol. 8, no. 4, pp. 3569-3581, 2020, doi: 10.1109/JESTPE.2019.2958932.

[6] V. B. Vu, A. Ramezani, A. Triviño, J. M. González-González, N. B. Kadandani, M. Dahidah, V. Pickert, M. Narimani, and J. Aguado, "Operation of Inductive Charging Systems under Misalignment Conditions: A Review for Electric Vehicles," *IEEE Trans. Transport. Electrific.*, pp. 1-1, 2022, doi: 10.1109/TTE.2022.3165465.

[7] D. Patil, M. K. McDonough, J. M. Miller, B. Fahimi, and P. T. Balsara, "Wireless Power Transfer for Vehicular Applications: Overview and Challenges," *IEEE Trans. Transport. Electrific.*, vol. 4, no. 1, pp. 3-37, 2018, doi: 10.1109/TTE.2017.2780627.

[8] J. Lu, G. Zhu, and C. C. Mi, "Foreign object detection in wireless power transfer systems," *IEEE Transactions on Industry Applications*, pp. 1-1, 2021, doi: 10.1109/tia.2021.3057603.

[9] H. Feng, R. Tavakoli, Z. Pantic, and O. C. Onar, "Advances in High-Power Wireless Charging Systems: Overview and Design Considerations," *IEEE Trans. Transport. Electrific.*, pp. 1-1, 2020, doi: 10.1109/TTE.2020.3012543.

[10] S. Y. Jeong, V. X. Thai, J. H. Park, and C. T. Rim, "Self-Inductance-Based Metal Object Detection With Mistuned Resonant Circuits and Nullifying Induced Voltage for Wireless EV Chargers," *IEEE Trans. Power Electron.*, vol. 34, no. 1, pp. 748-758, 2019, doi: 10.1109/TPEL.2018.2813437.

[11] S. Y. Chu, X. Zan, and A. T. Avestruz, "Electromagnetic Model-Based Foreign Object Detection for Wireless Power Transfer," *IEEE Trans. Power Electron.*, vol. 37, no. 1, pp. 100-113, 2022, doi: 10.1109/TPEL.2021.3100420.

[12] Y. Tian, Z. Li, Y. Lin, L. Xiang, X. Li, Y. Shao, and J. Tian, "Metal object detection for electric vehicle inductive power transfer systems based on hyperspectral imaging," *Measurement*, vol. 168, p. 108493, 2021/01/15/ 2021, doi: https://doi.org/10.1016/j.measurement.2020.108493.

[13] T. Sonnenberg, A. Stevens, A. Dayerizadeh, and S. Lukic, "Combined Foreign Object Detection and Live Object Protection in Wireless Power Transfer Systems via Real-Time Thermal Camera Analysis," in *2019 IEEE Applied Power Electronics Conference and Exposition (APEC)*, 17-21 Mar. 2019 2019, pp. 1547-1552, doi: 10.1109/APEC.2019.8721804.

[14] J. Xia, X. Yuan, J. Li, S. Lu, X. Cui, S. Li, and L. M. Fernendez-Ramirez, "Foreign Object Detection for Electric Vehicle Wireless Charging," *Electronics*, vol. 9, no. 5, p. 805, 2020. [Online]. Available: https://www.mdpi.com/2079-9292/9/5/805.

[15] L. Xiang, Z. Zhu, J. Tian, and Y. Tian, "Foreign Object Detection in a Wireless Power Transfer System Using Symmetrical Coil Sets," *IEEE Access*, vol. 7, pp. 44622-44631, 2019, doi: 10.1109/ACCESS.2019.2908866.

[16] S. Niu, S. Niu, C. Zhang, and L. Jian, "Blind-Zone-Free Metal Object Detection for Wireless EV Chargers Employing DD coils by Passive Electromagnetic Sensing," *IEEE Trans. Ind. Electron.*, pp. 1-1, 2022, doi: 10.1109/TIE.2022.3150114.

[17] A. Ahmad, M. S. Alam, and R. Chabaan, "A Comprehensive Review of Wireless Charging Technologies for Electric Vehicles," *IEEE Trans. Transport. Electrific.*, vol. 4, no. 1, pp. 38-63, 2018, doi: 10.1109/TTE.2017.2771619.

We claim:

1. A system for detection of one or more foreign objects during wireless charging adapted for continued operation despite a misalignment of a transmitter coil and a receiver coil, the system comprising:
    a set of sensor coils positioned relative to charging coils of a wireless transmitter, the set of sensor coils including a first sensor coil set and a second sensor coil set that are mirrored about one or more axes of radial symmetry from one another relative to a plane of operation of the wireless transmitter;
    at least one comparator coupled to coils in the first sensor coil set and coils in the second sensor coil set to determine differential voltages or currents between the first sensor coil set and the second sensor coil set;
    wherein changes in induced voltage or current in the first sensor coil set and the second sensor coil set due to the misalignment of the transmitter coil and the receiver coil are compensated due to positioning of the first sensor coil set and the second sensor coil set relative to one another.

2. The system of claim 1, wherein at least one of the first sensor coil set and the second sensor coil set are subdivided into a plurality of portions which are positioned in a symmetrical layout where the misalignment of the transmitter coil and the receiver coil is compensated in a plurality of directional or rotational misalignments simultaneously.

3. The system of claim 2, wherein each of the first sensor coil set and the second sensor coil set are each subdivided into portions and pairs of the subdivided portions are mirrored relative to one another.

4. The system of claim 2, wherein a number of the plurality of portions of the first sensor coil set or the second sensor coil set is determined based on a target sensitivity of the differential voltages or currents and a width of each sensor coil in the set of sensor coils is determined at least based on the number of the plurality of portions of the first sensor coil set or the second sensor coil set.

5. The system of claim 1, wherein the comparator is coupled to the first sensor coil set and the second sensor coil set across at least one of a potentiometer through a multiplexer circuit and the differential voltages or currents are obtained at the mid-point of the potentiometer.

6. The system of claim 1, wherein:
    a width of each sensor coil in the set of sensor coils is determined at least based on a target voltage or current sensitivity of the differential voltage or current, or a target object size;
    the wireless charging is conducted between a power source and an electric vehicle or a portable electronic device; or
    upon the differential voltage or current being greater than a threshold differential voltage or current, an alarm notification or control output is generated.

7. A method for detecting of one or more foreign objects during wireless charging adapted for continued operation despite a misalignment of a transmitter coil and a receiver coil, the method comprising:
    sensing one or more voltages or currents using a set of sensor coils positioned relative to charging coils of a wireless transmitter, the set of sensor coils including a first sensor coil set and a second sensor coil set that are mirrored about one or more axes of radial symmetry from one another relative to a plane of operation of the wireless transmitter;
    determining differential voltages or currents based at least on the one or more voltages or currents;
    wherein changes in induced voltage or current in the first sensor coil set and the second sensor coil set due to the misalignment of the transmitter coil and the receiver coil are compensated due to positioning of the first sensor coil set and the second sensor coil set relative to one another.

8. The method of claim 7, wherein at least one of the first sensor coil set and the second sensor coil set are subdivided into a plurality of portions which are positioned in a symmetrical layout where the misalignment of the transmitter coil and the receiver coil is compensated in a plurality of directional or rotational misalignments simultaneously.

9. The method of claim 8, wherein each of the first sensor coil set and the second sensor coil set are each subdivided into portions and pairs of the subdivided portions are mirrored relative to one another.

10. The method of claim 8, wherein a number of the plurality of portions of the first sensor coil set or the second sensor coil set is determined based on a target sensitivity of the differential voltages or currents and a width of each sensor coil in the set of sensor coils is determined at least based on the number of the plurality of portions of the first sensor coil set or the second sensor coil set.

11. The method of claim 7, wherein a comparator is used for detecting the differential voltages or currents, and the comparator is coupled to the first sensor coil set and the second sensor coil set across at least one of a potentiometer through a multiplexer circuit and the differential voltages or currents are obtained at the mid-point of the potentiometer.

12. The method of claim 7, wherein:
a width of each sensor coil in the set of sensor coils is determined at least based on a target voltage or current sensitivity of the differential voltage or current, or a target object size,
the wireless charging is conducted between a power source and an electric vehicle or a portable electronic device; or
upon the differential voltage or current being greater than a threshold differential voltage or current, an alarm notification or control output is generated.

13. A method for detecting of one or more foreign objects before wireless charging starts adapted for continued operation despite a misalignment of a transmitter coil and a receiver coil, the method comprising:
applying an auxiliary high frequency voltage on the sensor coils and sensing one or more voltages or currents using a set of sensor coils positioned relative to charging coils of a wireless transmitter, the set of sensor coils including a first sensor coil set and a second sensor coil set that are mirrored about one or more axes of radial symmetry from one another relative to a plane of operation of the wireless transmitter;
determining differential voltages or currents based at least on the one or more voltages or currents;
wherein changes in coil or auxiliary load voltage or current in the first sensor coil set and the second sensor coil set due to the misalignment of the transmitter coil and the receiver coil are compensated due to positioning of the first sensor coil set and the second sensor coil set relative to one another.

14. The method of claim 13, wherein at least one of the first sensor coil set and the second sensor coil set are subdivided into a plurality of portions which are positioned in a symmetrical layout where the misalignment of the transmitter coil and the receiver coil is compensated in a plurality of directional or rotational misalignments simultaneously.

15. The method of claim 14, wherein each of the first sensor coil set and the second sensor coil set are each subdivided into portions and pairs of the subdivided portions are mirrored relative to one another.

16. The method of claim 14, wherein a number of the plurality of portions of the first sensor coil set or the second sensor coil set is determined based on a target sensitivity of the differential voltages or currents and a width of each sensor coil in the set of sensor coils is determined at least based on the number of the plurality of portions of the first sensor coil set or the second sensor coil set.

17. The method of claim 13, wherein a comparator is used for detecting the differential voltages or currents, and the comparator is coupled to the first sensor coil set and the second sensor coil set across at least one of a potentiometer through a multiplexer circuit and the differential voltages or currents are obtained at the mid-point of the potentiometer.

18. The method of claim 13, wherein;
a width of each sensor coil in the set of sensor coils is determined at least based on a target voltage or current sensitivity of the differential voltage or current, or a target object size;
the wireless charging is conducted between a power source and an electric vehicle or a portable electronic device; or
upon the differential voltage or current being greater than a threshold differential voltage or current, an alarm notification or control output is generated.

19. The method claim 13, wherein the auxiliary high frequency voltage has a frequency within the range of 1 and 6.8 MHz.

20. A non-transitory computer readable medium storing machine interpretable instructions thereon, which when executed by a processor, cause the processor to perform steps of a method for detecting of one or more foreign objects during wireless charging adapted for continued operation despite a misalignment of a transmitter coil and a receiver coil, the method comprising:
sensing one or more voltages or currents using a set of sensor coils positioned relative to charging coils of a wireless transmitter, the set of sensor coils including a first sensor coil set and a second sensor coil set that are mirrored about one or more axes of radial symmetry from one another relative to a plane of operation of the wireless transmitter;
determining differential voltages or currents based at least on the one or more voltages or currents;
wherein changes in induced voltage or current in the first sensor coil set and the second sensor coil set due to the misalignment of the transmitter coil and the receiver coil are compensated due to positioning of the first sensor coil set and the second sensor coil set relative to one another.

* * * * *